(12) United States Patent
Goto et al.

(10) Patent No.: US 7,907,230 B2
(45) Date of Patent: Mar. 15, 2011

(54) DISPLAY DEVICE HAVING A DISPLAY CABINET WITH RIB PORTIONS SURROUNDING THE RIM OF A FRONT AND BACK COVER

(75) Inventors: Katsuichi Goto, Kawasaki (JP); Daisuke Mihara, Kawasaki (JP); Kaigo Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 12/222,729

(22) Filed: Aug. 14, 2008

(65) Prior Publication Data

US 2009/0167978 A1   Jul. 2, 2009

(30) Foreign Application Priority Data

Dec. 28, 2007  (JP) ................................ 2007-339260

(51) Int. Cl.
*G02F 1/1333*  (2006.01)
*H05K 5/00*  (2006.01)

(52) U.S. Cl. ...................................... 349/58; 361/679.27

(58) Field of Classification Search .................... 349/56, 349/58; 361/679.26–679.28
See application file for complete search history.

(56) References Cited

U.S. PATENT DOCUMENTS

| 5,905,550 A | 5/1999 | Ohgami et al. |
| 2007/0216702 A1* | 9/2007 | Takahashi et al. ............ 345/582 |

FOREIGN PATENT DOCUMENTS

| JP | 09-297542 | 11/1997 |
| JP | 2000-071145 | 3/2000 |
| JP | 2001-021882 | 1/2001 |
| JP | 2001-264732 | 9/2001 |
| JP | 2002-244767 | 8/2002 |
| JP | 3348214 | 9/2002 |
| JP | 2004-133241 | 4/2004 |
| JP | 2006-113480 | 4/2006 |

* cited by examiner

*Primary Examiner* — Mark A Robinson
*Assistant Examiner* — Paul C Lee
(74) *Attorney, Agent, or Firm* — Staas & Halsey LLP

(57) ABSTRACT

In a first area, a projection section provided in a second rib is inserted into a hollow section provided in a first rib, and the first rib and the second rib are overlapped with each other such that the second rib is located inside the first rib. In a second area, the first rib and the second rib are overlapped with each other such that the first rib is located inside the second rib. Therefore, a front rib and a back rib prevent each other from moving in an overlapping direction. Accordingly, it is possible to fix the front rib and the back rib without using a rib which is another component, thereby making it possible to reduce the size and weight of an apparatus while increasing the size of a display screen.

5 Claims, 36 Drawing Sheets

DISPLAY DEVICE HAVING A DISPLAY CABINET WITH RIB PORTIONS SURROUNDING THE RIM OF A FRONT AND BACK COVER

BACKGROUND OF THE INVENTION

1. Field of the Invention

The present invention relates to a display device and an electronic apparatus containing a display panel in a cabinet.

2. Description of the Related Art

In recent years, there has been widely used a portable electronic apparatus provided with a display device for displaying information, such as a portable phone and a laptop personal computer. In the portable electronic apparatus, it is strongly requested to reduce the size and weight of the apparatus, while increasing the size of a display screen. Therefore, such efforts have been made that the display device which uses a thin and light liquid crystal panel is employed, and that a light source, a control board and the like are disposed in a back side of the liquid crystal panel instead of being disposed in a flank of the liquid crystal panel so that the display screen can be expanded by reducing the space between the cabinet and the liquid crystal panel. In recent years, wide-type electronic apparatus have become popular, in which the display screen is expanded up to the flanks of the cabinet.

In the wide-type electronic apparatus, there is widely used such a display cabinet that a front cover covering the rim of the front of a liquid crystal panel, and a back cover covering the back of the liquid crystal panel are engaged with each other at the flanks of the liquid crystal panel. To further downsize the electronic apparatus, it is necessary to reduce the portion where the front cover and the back cover engaged with each other.

As a method for engaging the front cover with the back cover, Japanese Patent Application Publication No. 2000-71145 discloses a method which inserts an engaging part provided at an edge of the back cover into a hole provided along an edge of the front cover, and fixes the front cover and the back cover with a screw. However, in the method disclosed in Japanese Patent Application Publication No. 2000-71145, since the screw is fixed to each of the plural engaging parts, the weight of the apparatus as well as the production cost are increased. Japanese Patent Application Publication No. 2002-244767 discloses a method which inserts a projection provided on an end surface of a second covet into a hole formed in an end surface of a first cover, and inserts a outwardly protruding projection formed on a rib fixed to an inner surface of the first cover into a hole formed in the second cover. According to the method disclosed in Japanese Patent Application Publication No. 2002-244767, since the first cover and the second cover are restricted to move in two directions that the first cover and the second cover mutually cross, the two covers can be securely fixed to each other without the screw.

According to the technique disclosed in Japanese Patent Application Publication No. 2002-244767, since another component is provided in addition to the first cover and the second cover, the width of a frame surrounding the display panel becomes larger, and the display cabinet becomes larger as compared with the size of the display screen.

SUMMARY OF THE INVENTION

The present invention has been made in view of the above circumstances and provides a display device and an electronic apparatus whose size and weight are reduced while the size of the display screen is increased.

A display device according to the present invention includes:

a display panel which includes a display screen on a front surface thereof; and a display cabinet which has a front cover and a back cover, the front cover including a front frame which exposes the display screen while covering a perimeter of the front surface of the display panel and a front rib which surrounds a rim of the front frame and goes around a perimeter of the display panel along flanks of the display panel, and the back cover including a back plate which covers a back surface of the display panel and a back rib which surrounds a rim of the back plate while going around a perimeter of the display panel along the flanks of the display panel and covers the flanks of the display panel in cooperation with the front rib, wherein a first rib which is one of the front rib and the back rib includes a first end surface facing a second rib which is the other of the front rib and the back rib, the first rib further includes a plurality of hollow sections formed at spacing along the flank of the display panel and are opened in both of the first end surface and an inner surface, the second rib includes a second end surface facing the first rib, and the second rib further includes a plurality of projection sections formed at spacing to correspond to the hollow sections and inserted into the hollow sections, the display device has such a structure that in a plurality of first areas which are provided along the flank of the display panel and in each of which the hollow section and the projection section are formed, the projection section is inserted into the hollow section, and the first end surface and the second end surface abut each other, and the display device further has such a structure that in a second area which is provided along the flank of the display panel and different from the first area, the first end surface and the second end surface abut each other, and the first rib has an overlapping section which protrudes to the inside of the second rib beyond the second end surface and overlaps with an inner side of the second rib.

According to the above-described basic aspect of the display device, in the first area, the projection section provided in the second rib is inserted into the hollow section provided in the first rib, and the first rib and the second rib are overlapped with each other such that the second rib is located inside the first rib, whereas in the second area, the first rib and the second rib are overlapped with each other such that the first rib is located inside the second rib. Therefore, the front rib and the back rib prevent each other from moving in an overlapping direction. Accordingly, it is possible to fix the front rib and the back rib without using a rib which is another component, thereby making it possible to reduce the size and weight of the apparatus while increasing the size of the display screen.

In the display device according to the present invention, preferably, the first rib includes an engaging projection section which projects outwardly at a position near a tip of the overlapping section in a partial area of the second area, and the second rib includes, in the partial area, an engaged projection section which is engaged in a hollow formed at a position closer to the first end surface than the engaging projection section is.

According to this additional feature, it is possible to securely prevent the front cover and the back cover from being slipped out in a front and back direction.

In the display device according to the present invention, preferably, a width of the single second area in a direction along the flank of the display panel is formed larger than a width of the single first area in the direction along the flank of the display panel.

According to this additional feature of the display device, a distance between the first areas in which the hollow section is provided is wide and thus, it is possible to maintain the strength of the display cabinet.

An electronic apparatus according to the present invention includes:

the display device according to any of the above-described basic aspect and the additional features; and an information processing circuit which generates and transfers display information to the display device.

According to the basic aspect of the electronic apparatus, it is possible to downsize a part in which the front cover and the back cover are engaged with each other, thereby reducing the size and weight of the apparatus while increasing the size of the display screen.

The electronic apparatus according to the above-described basic aspect further includes:

a main housing which contains the information processing circuit; and a coupling section which couples the display cabinet openably and closably to the main housing.

The electronic apparatus in which the display cabinet and the main housing are openably and closably coupled to each other can be folded to a small size and thus, it is frequently carried around. For this reason, there is strong demand for reduction in the size and weight of the apparatus as well as increase in the size of the display screen. Thus, according to the basic aspect of the above electronic apparatus, the significant advantageous effect can be obtained.

As described above, according to the basic aspect of the display apparatus and the electronic apparatus, it is possible to reduce the size and weight of the apparatus while increasing the size of the display screen.

DETAILED DESCRIPTION OF THE INVENTION

Figure 1:
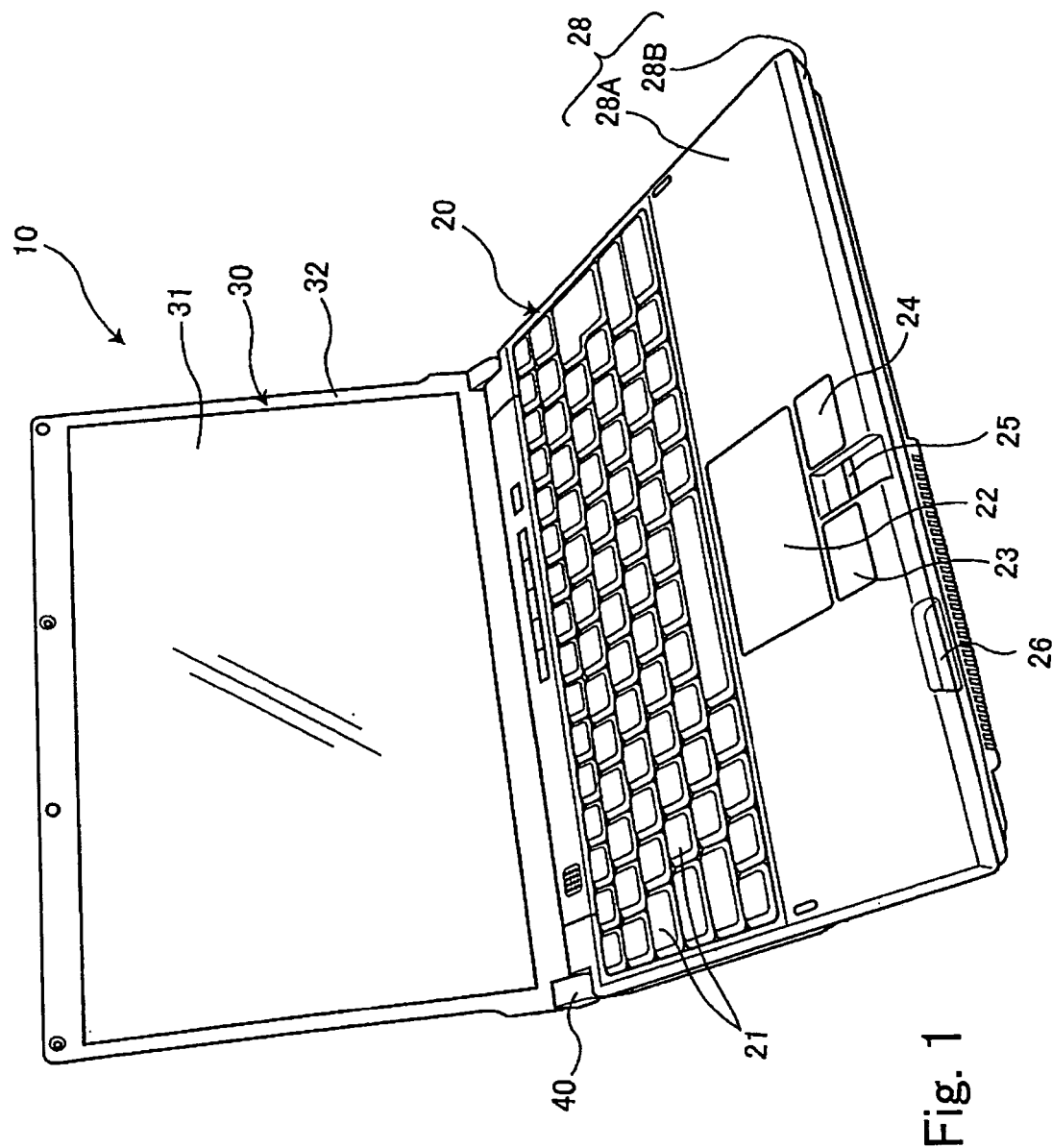
FIG. 1 is an exterior appearance diagram of a personal computer which is a first embodiment of an electronic apparatus.

Embodiments of the present invention will be described below by referring to the drawings.

FIG. 1 is an exterior appearance diagram of a personal computer 10 which is a first embodiment of the electronic apparatus according to the present invention.

The personal computer 10 is provided with a main unit 20 and a display unit 30, the display unit 30 is openably and closably combined with the main unit 20 via a hinge section 40. The main unit 20 corresponds to an example of the main section of the present invention, the display unit 30 corresponds to an example of the display section of the present invention, and the hinge section 40 corresponds to an example of the coupling section of the present invention. FIG. 1 illustrates a diagram obtained by viewing, from the front, the personal computer 10 in which the display unit 30 is opened.

The main unit 20 is used to execute various information processes, and a CPU, a hard disk, and the like are contained in a main housing 28. The main housing 28 is configured with a high-strength metallic upper case 28A and a high-strength metallic lower case 28B. An upper surface of the upper case 28A includes a keyboard in which plural keys 21 are arranged, a track pad 22, a left click button 23, a right click button 24, and the like. Further, a fingerprint sensor 25 for authenticating a fingerprint by scanning a fingertip, and a medium loading aperture 26, to which a small recording medium is loaded, are provided in the front area of the upper case 28A.

The display unit 30 is used to display a result of the information process executed by the main unit 20, and a display housing 32 contains a thin-type liquid crystal panel, a controlling circuit for the liquid crystal panel, an antenna for the communication, and the like. The display housing 32 is configured with a front cover 32A and a back cover 32B (refer to FIG. 2), and a display screen 31 of the liquid crystal panel is arranged in the front side, and the liquid crystal panel is sandwiched between the front cover 32A and the back cover 32B. Meanwhile, since various electronic components are allocated not in a flank of the liquid crystal panel, but in a back of the liquid crystal, the display unit 30 is a wide-type display device in which the display screen 31 is expanded up to a portion around the flanks of the display housing 32.

Figure 2:
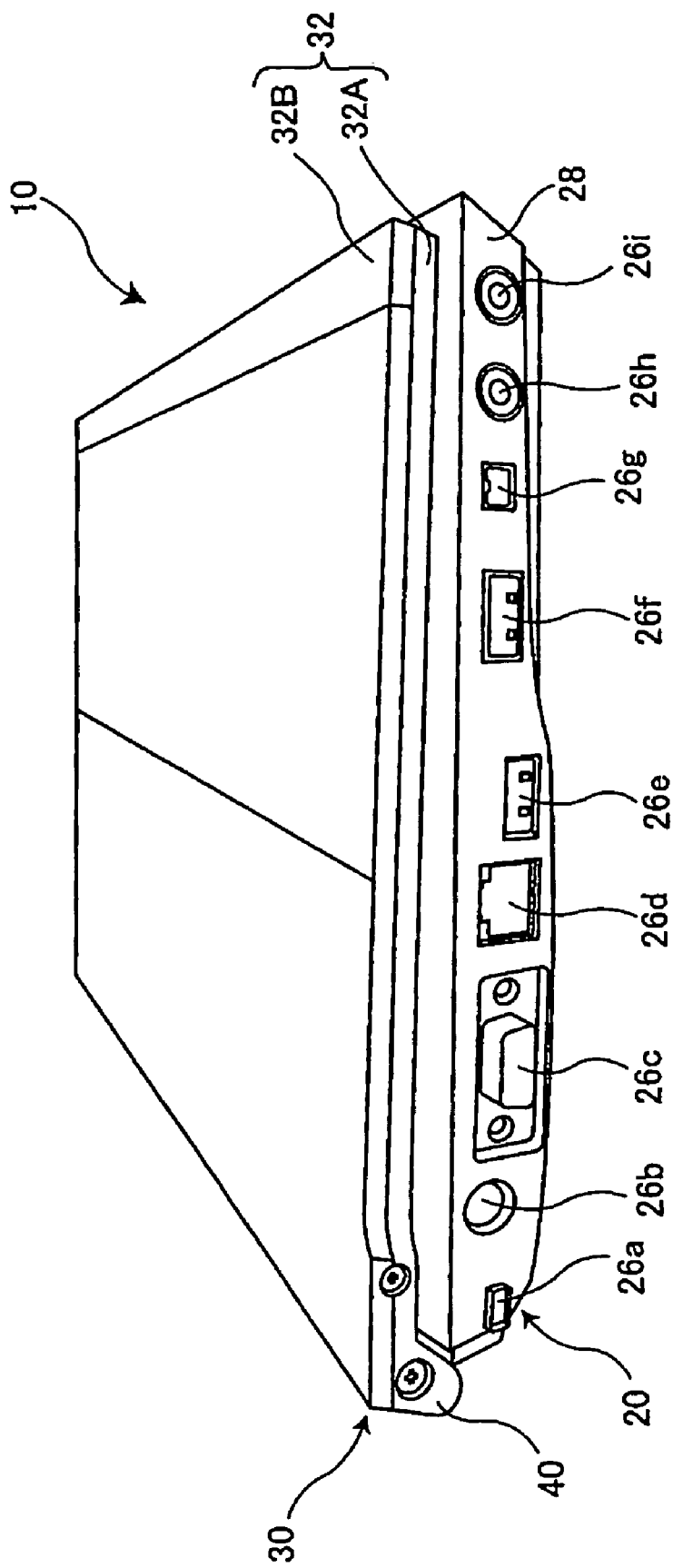
FIG. 2 is a diagram illustrating a flank of the personal computer.

FIG. 2 is a diagram illustrating one flank of the personal computer 10.

The flank of the main unit 20 shown here includes a security slot 26a for a lock including a wire cable, a connector 26b for a power source module, a connector 26c for an external monitor, a connector 26d for a LAN cable, connectors 26e and 26f for a USB, a connector 26g for an audio jack, a connector 26h for a microphone, a connector 26i for a head phone, and the like.

Figure 3:
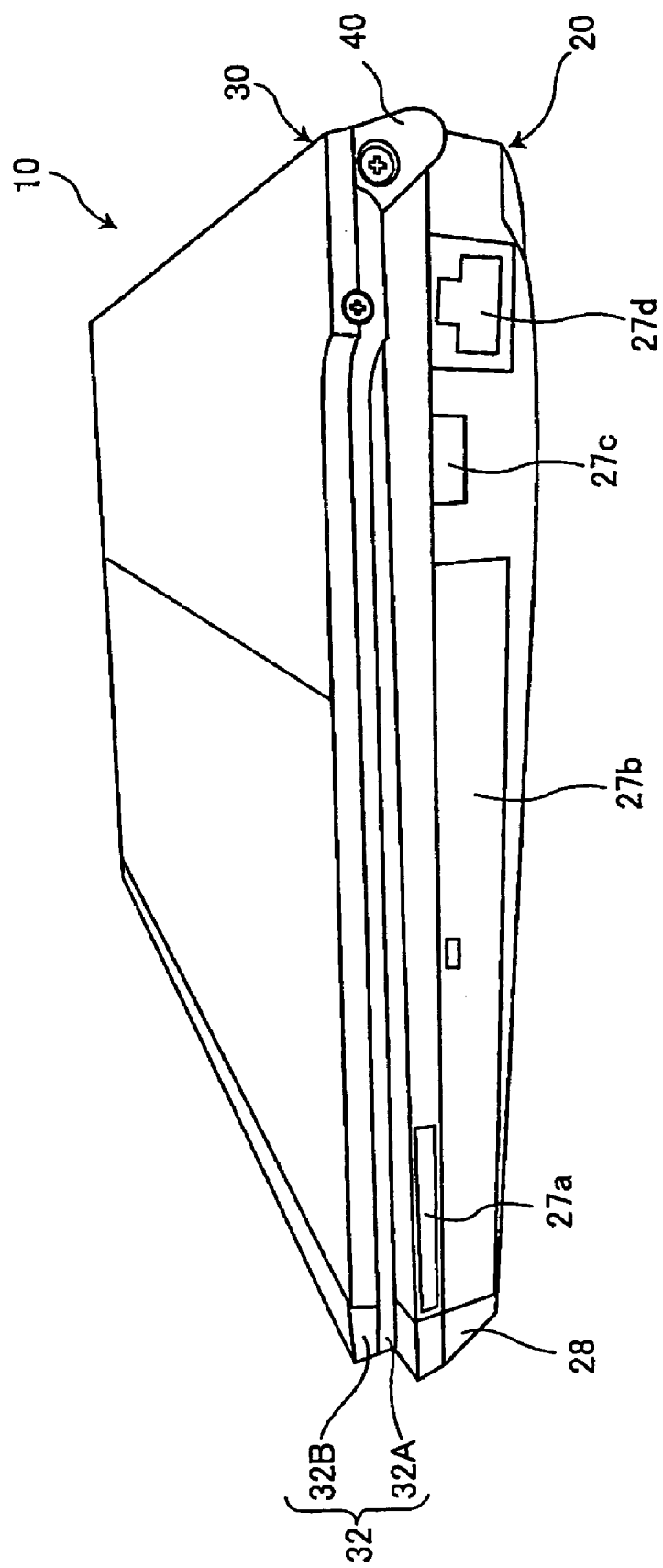
FIG. 3 is a diagram illustrating a flank of the personal computer opposite to the flank shown in FIG. 2.

FIG. 3 is a diagram illustrating a flank of the personal computer 10 in an opposite side of FIG. 2.

Another flank of the main unit 20, which is opposite to the flank shown in FIG. 2 includes an expansion card loading aperture 27a for loading an expansion card for expanding a function, such as a LAN card, an optical disk loading aperture 27b for loading a disk such as a CD and a DVD, a connector 27c for a USB, and a connector 27d for a modem.

Figure 4:
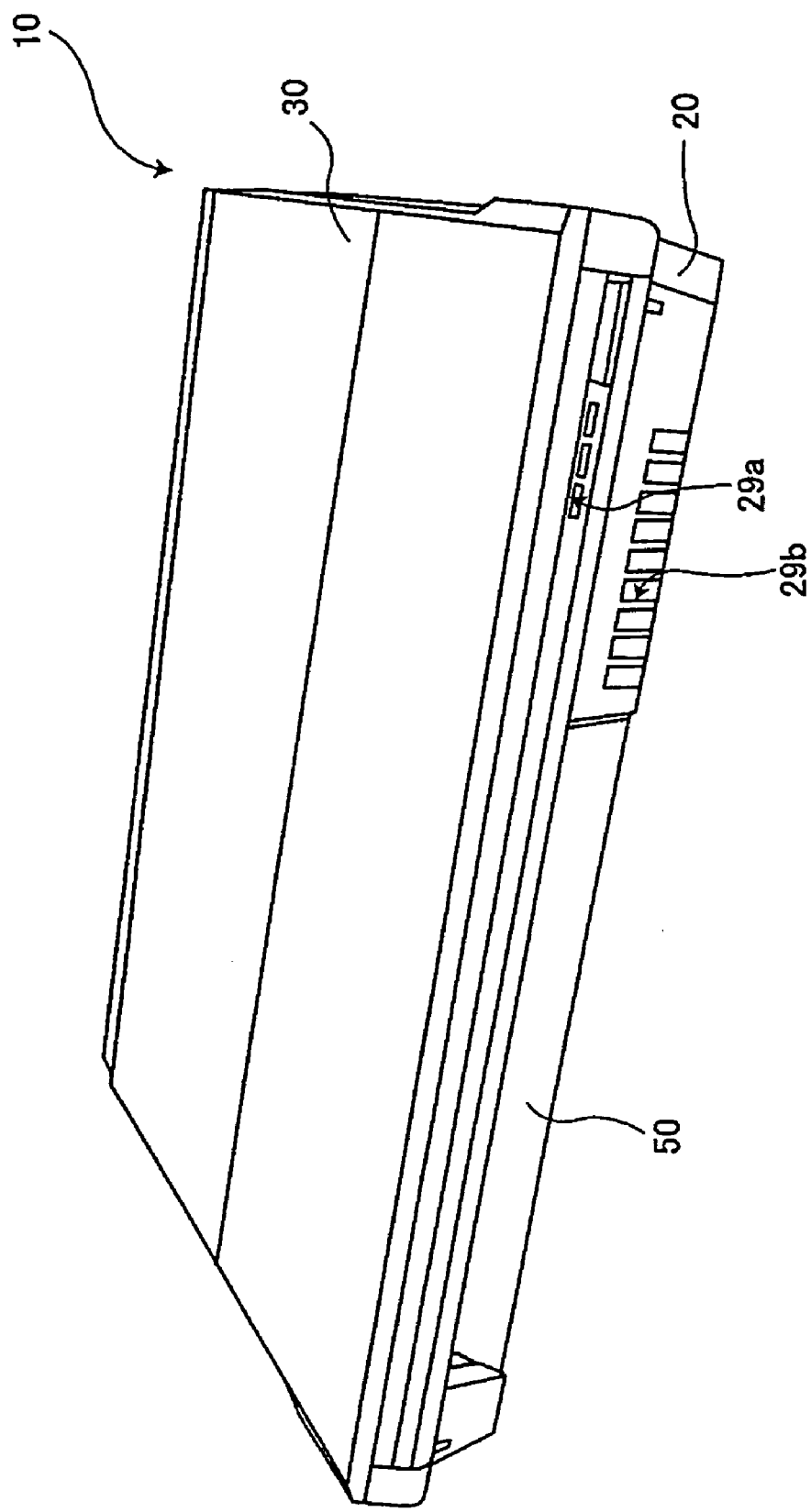
FIG. 4 is a back diagram of the personal computer.

FIG. 4 is a back diagram of the personal computer 10.

The back of the personal computer 10 includes an air inlet 29a and an air outlet 29b configured in a cooling mechanism for radiating heat produced by electronic components. Since the air inlet 29a is provided above the air outlet 29b, it is possible to reduce such a disadvantage that the heat, which is accumulated around a bottom of the personal computer 10, is drawn from the air inlet 29a, so that the heat-exhausting efficiency can be maintained even if the personal computer 10 is continuously used. A battery pack 50 for the power supply is engaged in the main unit 20. The battery pack 50 corresponds to one example of the battery pack of the present invention.

Figure 5:
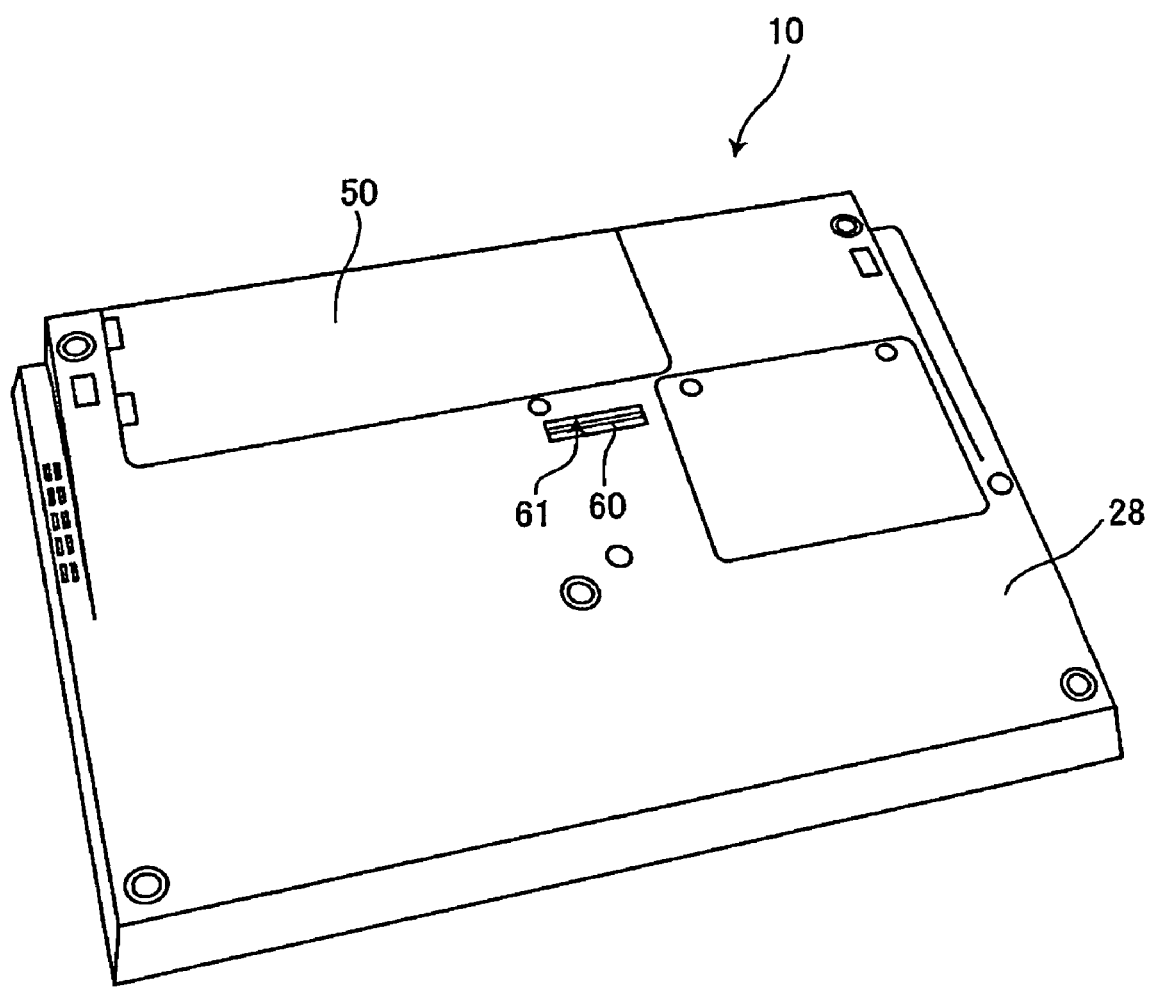
FIG. 5 is an underside diagram of the personal computer.

FIG. 5 is an underside diagram of the personal computer 10.

A connector for connecting to a peripheral device such as a printer, and a hard disk device for the expansion are mounted in the personal computer 10 of the present embodiment. Further, a port replicator, which is used to expand the function of the personal computer 10, is connected to the personal computer 10 of the present embodiment. The battery pack 50, which is also illustrated in FIG. 4, is exposed on an underside of the personal computer 10, and a expansion connector 60, which is to be coupled to a connector of the port replicator, is exposed from a through hole 61 provided in the main housing 28.

Next, an internal configuration of the personal computer 10 will be described.

Figure 6:
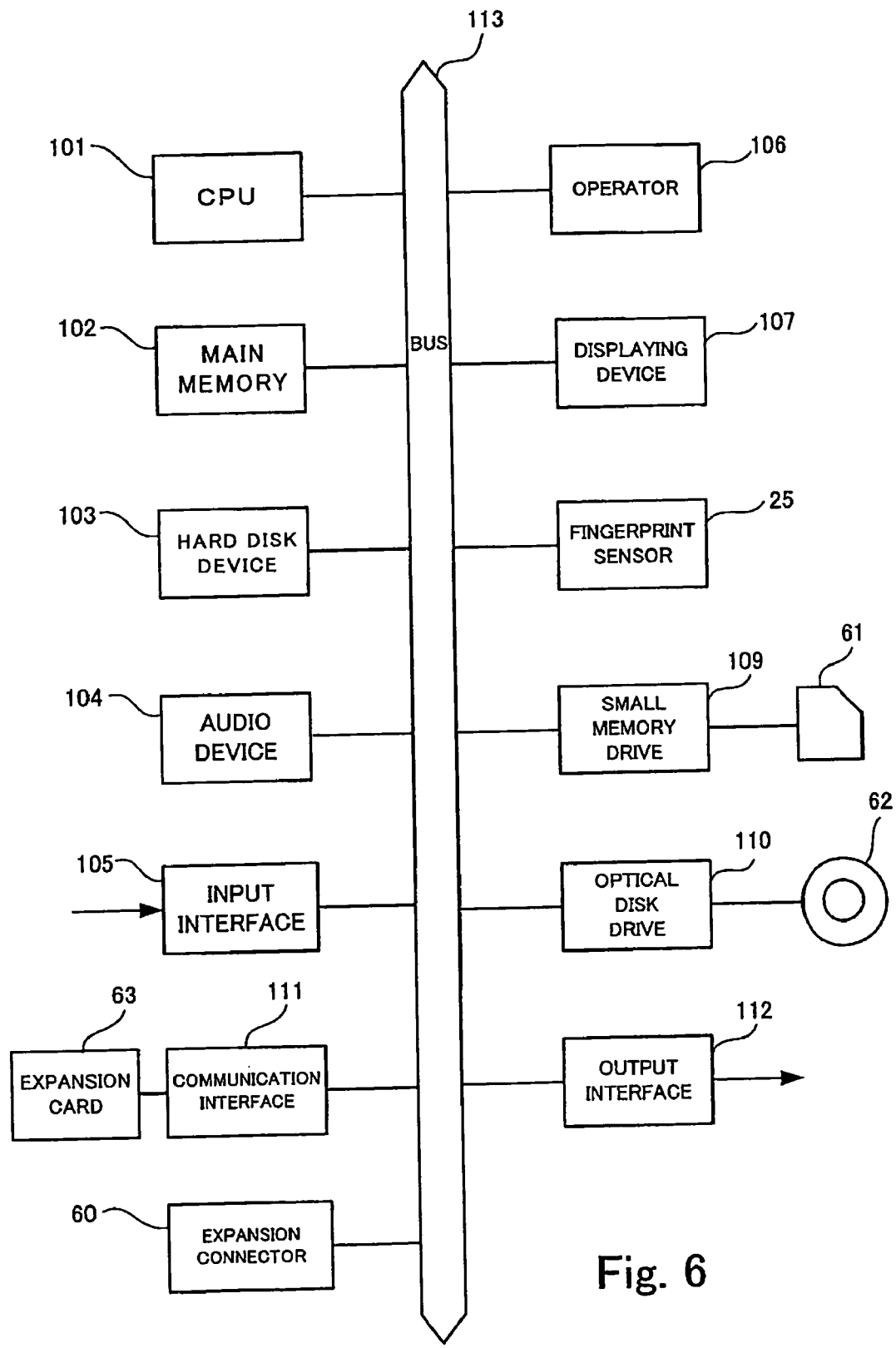
FIG. 6 is an internal block diagram of the personal computer.

FIG. 6 is an internal configuration diagram of the personal computer 10.

As illustrated in FIG. 6, the personal computer 10 incorporates a CPU 101 for executing various programs, a main memory 102 in which a program, which is stored in a hard disk device 103, is read and developed to be executed by the CPU 101, the hard disk device 103 in which various programs, data, and the like are stored, an audio device 104 in which a microphone, a speaker, and the like are mounted, an input interface 105 for inputting data from an external device, an operator 106 including a keyboard and the track pad 22, a display device 107 for displaying information on the display screen 31, the fingerprint sensor 25 which is also illustrated in FIG. 1, a small memory drive 109 in which a small recording medium 61 is loaded and the loaded small recording medium 61 is accessed, an optical disk drive 110 in which a CD-ROM 62 or a DVD is loaded, and the loaded CD-ROM 62 and DVD are accessed, a communication interface 111 for communicating by using an expansion card 63, an output interface 112 for outputting data to an external device, and the expansion connector 60. These components are mutually connected through a bus 113.

Here, in the personal computer 10 of the present embodiment, multiple efforts are made to reduce the size and weight of the apparatus and also to improve the impact resistance. First, the efforts that have been made to reduce the size and weight of the main unit 20 will be described.

Figure 7:
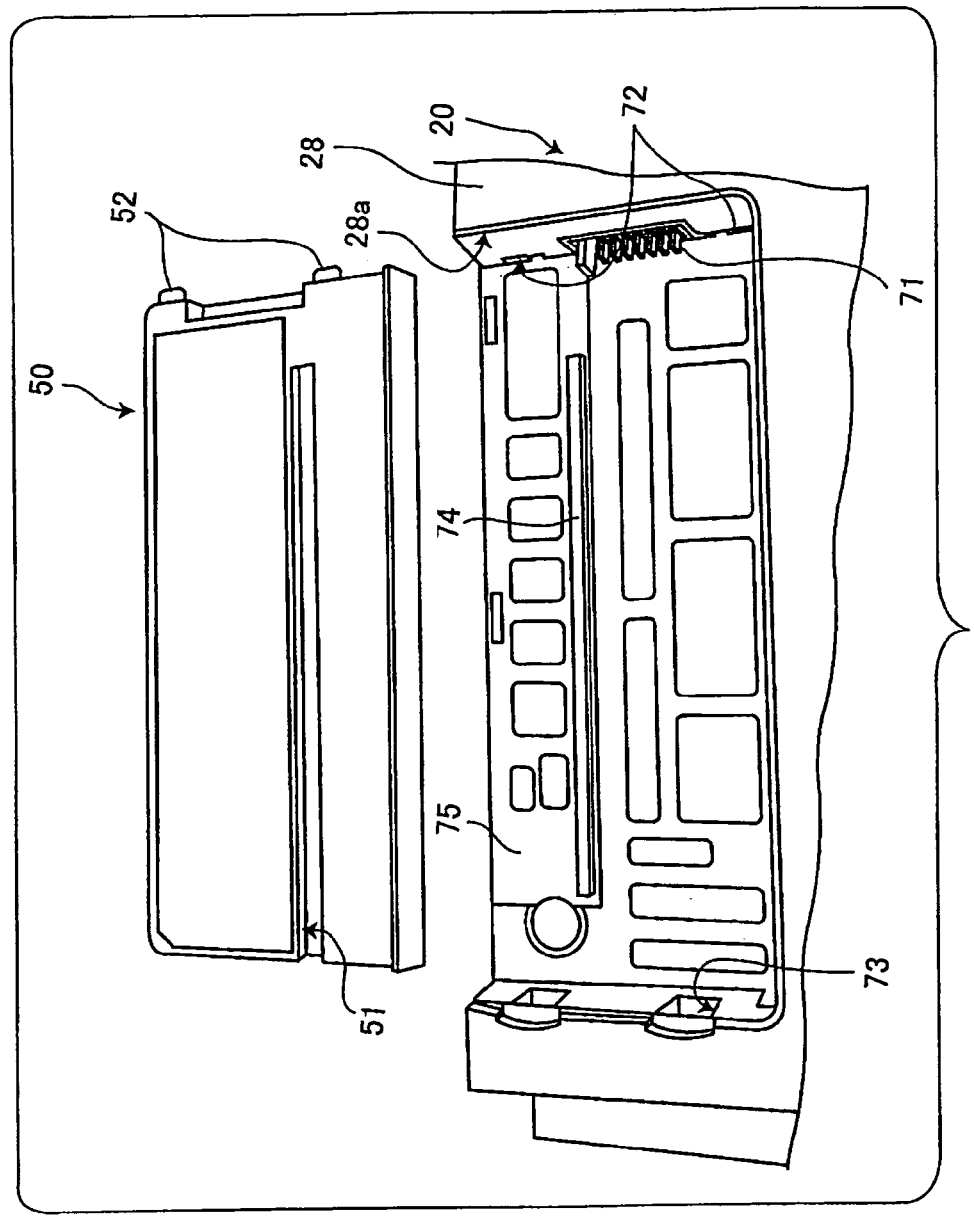
FIG. 7 is a diagram illustrating the underside of the personal computer when a battery pack is removed.

FIG. 7 is a diagram illustrating the underside of the personal computer 10 when the battery pack 50 is removed.

In the lower case 28B of the main housing 28, a cutout 28a is formed to extend from the flank to the underside of the personal computer 10. In the state where the battery pack 50 is removed from the main housing 28, a partition plate 75, in which elements such as a keyboard having the plural keys 21 arranged on the top thereof are to be mounted, is exposed on the surface. Space formed by the cutout 28a corresponds to one example of the accommodating section of the present invention.

The battery pack 50 includes a groove 51 which is extended in a longitudinal direction on a surface facing the main housing 28, and a projection 52 at a flank. The groove 51 corresponds to one example of the "groove section of the battery pack" of the present invention.

In the main housing 28, a projection section 74, which is to be engaged in the groove 51 of the battery pack 50, is formed in the underside of the partition plate 75. Further, provided at a sidewall of the cutout 28a are a power input terminal 71 for inputting the power from the battery pack 50, and a concave section 72 in which the projection 52 of the battery pack 50 is to be engaged. At the opposite sidewall of the cutout 28a, there are provided concave sections 73 in which nails 54 (refer to FIG. 10) formed in the battery pack 50 are to be engaged. Since the projection section 74 of the main housing 28 is engaged in the groove 51 of the battery pack 50, it is possible to easily position the battery pack 50 relative to the main housing 28, to prevent incorrect mounting of the battery pack 50, and to reduce the backlash of the battery pack 50. The projection section 74 corresponds to one example of the "projection section engaged in the groove section of the battery pack" of the present invention.

Figure 8:
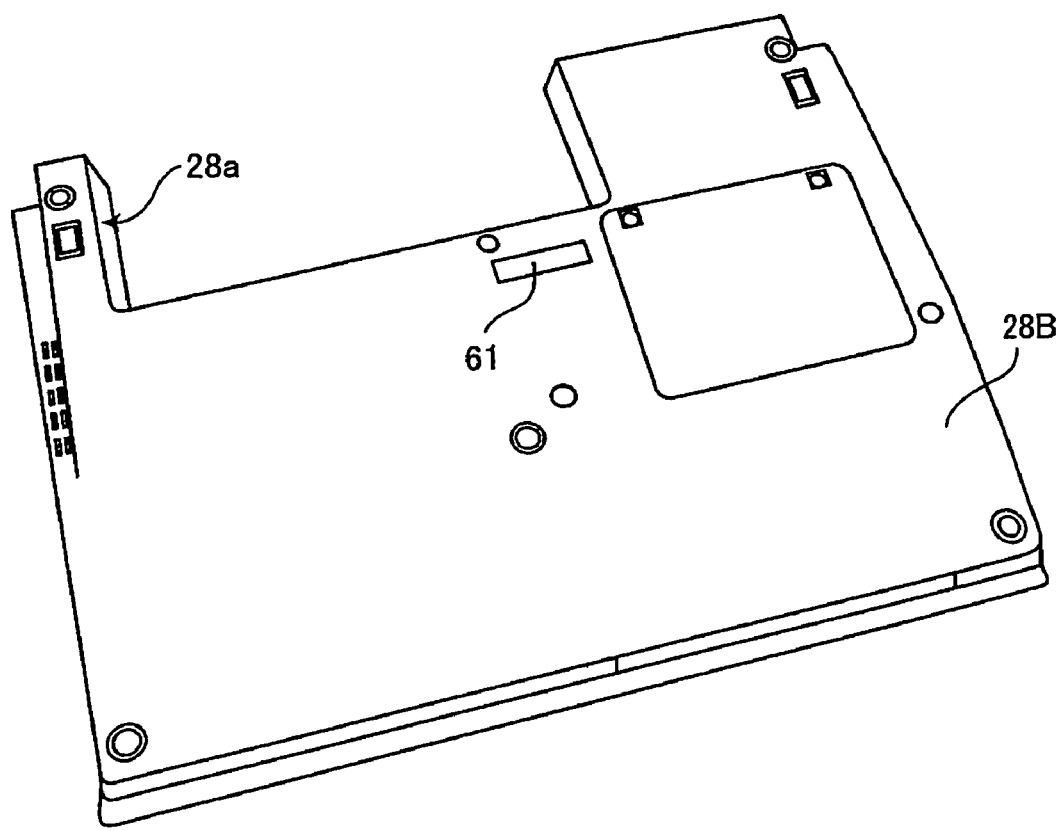
FIG. 8 is an underside diagram of a lower case while the battery pack is removed.

FIG. 8 is an underside diagram of the lower case 28B while the battery pack 50 is removed.

The cutout 28a is provided in the lower case 28B, and since the battery pack 50 is engaged in this cutout 28a, the underside and one side surface are exposed on the external surface of the personal computer 10. Therefore, since a part of the battery pack 50 is exposed on the external surface of the personal computer 10, it is possible to eliminate a part of the wall of the main housing 28 by the amount corresponding to the cutout 28a, so that the size and weight of the apparatus can be reduced.

Figure 9:
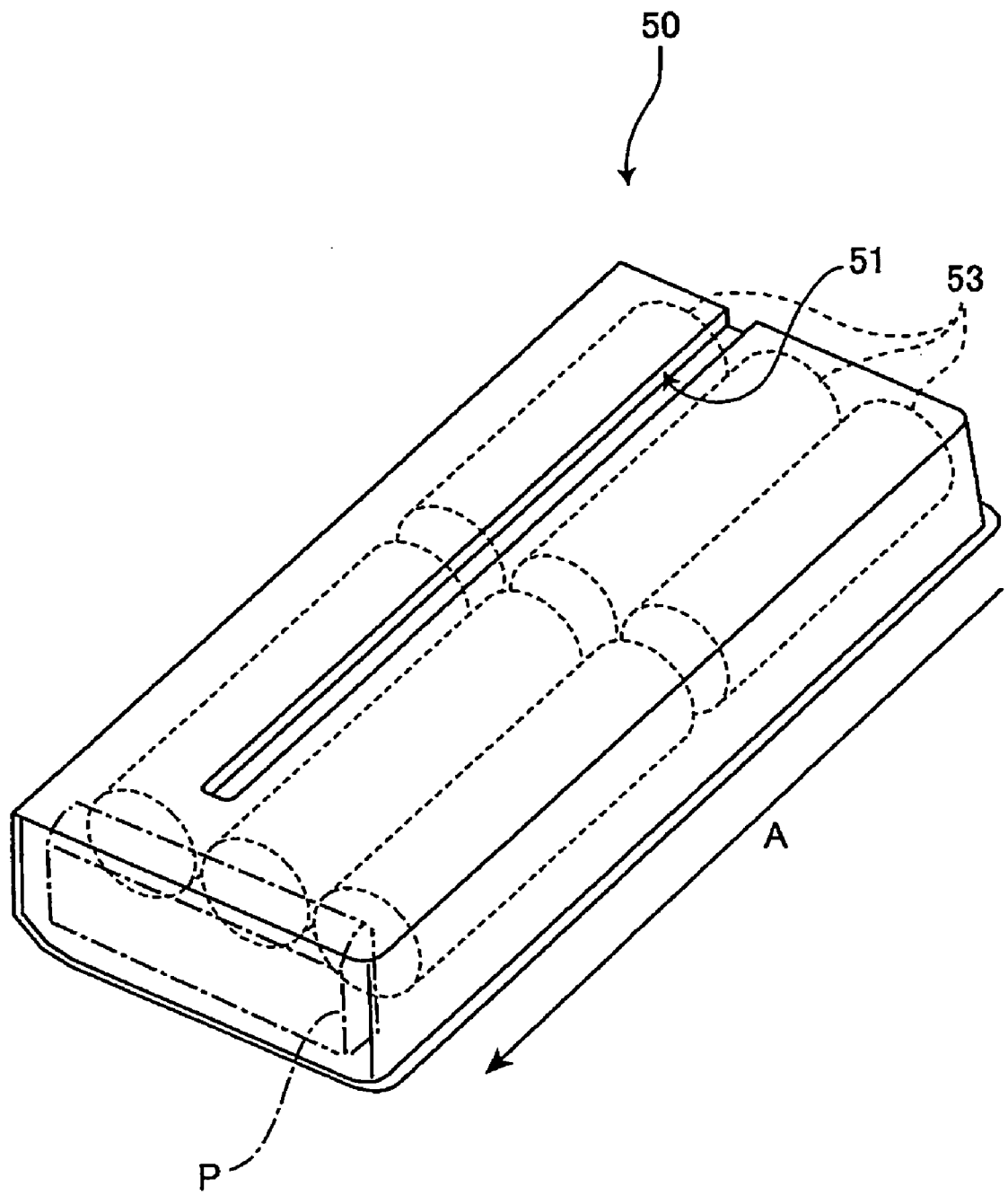
FIG. 9 is a transparent diagram of the battery pack.

FIG. 9 is a transparent diagram of the battery pack 50.

As illustrated in FIG. 9, plural cylindrical cells 53, whose central axes are arranged together to extend along the direction of an arrow A, are contained in the battery pack 50. The cell 53 corresponds to one example of the cell of the present invention. A clearance is formed between the adjacent cells 53 in the battery pack 50, and the groove 51 aligned with the clearance is formed in the external surface of the battery pack 50. In the present embodiment, since the groove 51 is formed by utilizing the clearance provided between the plural cells 53, it is possible to provide the sufficiently deep and long groove 51 without increasing the size of the apparatus, and to securely prevent the backlash of the battery pack 50. One edge side of the groove 51 is discontinuous in the surface of the battery pack 50, and electronic components, such as a power output terminal 55 (refer to FIG. 11) and a board, are contained in internal space P in the edge side. On the other hand, the other edge side of the groove 51 is extended up to the flank of the battery pack 50, and the groove 51 is longer than the projection section 74 illustrated in FIG. 7. Since the groove 51 is extended up to the edge of the battery pack 50, it is possible to easily mount the battery pack 50 to the main housing 28 and also, an area for engagement between the battery pack 50 and the main housing 28 is increased so that the backlash of the battery pack 50 can be surely suppressed.

Figure 10:
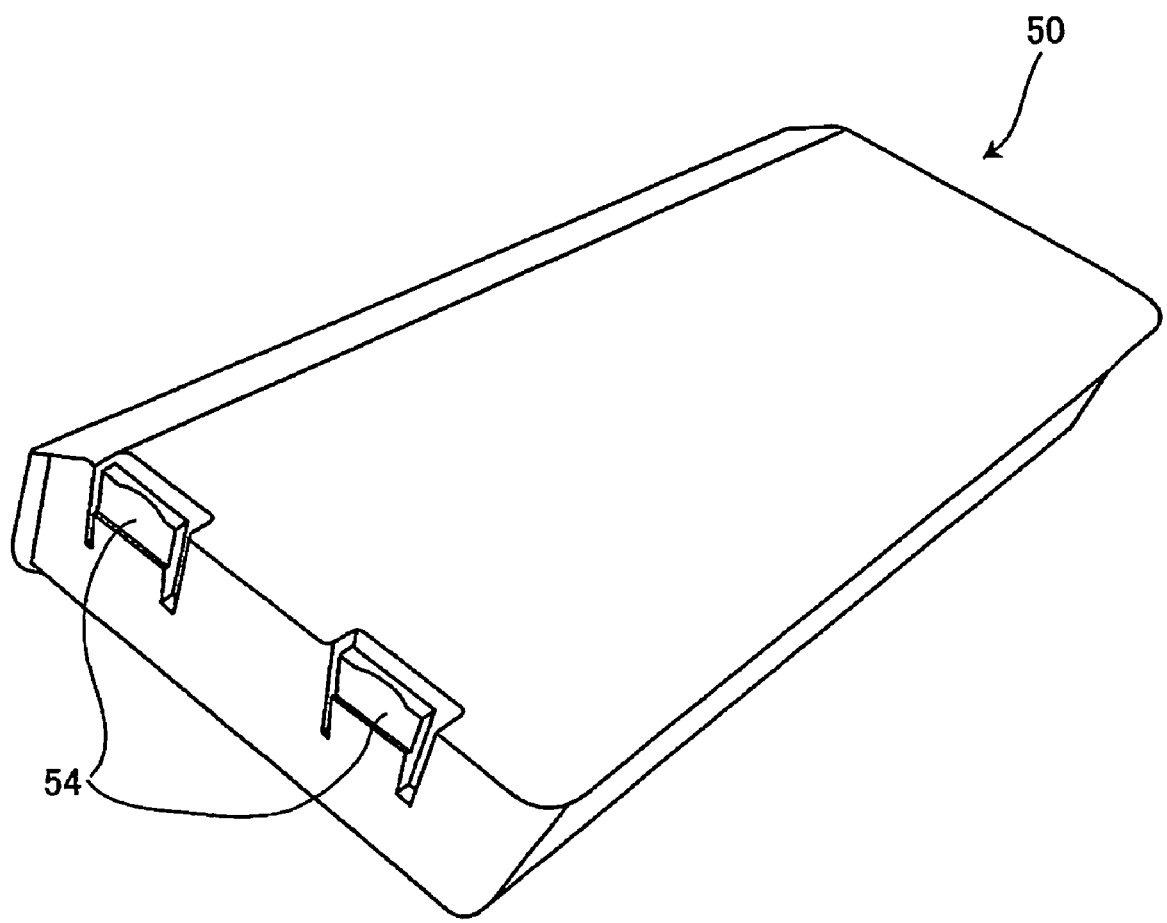
FIG. 10 is a diagram illustrating a flank of the battery pack.
Figure 11:
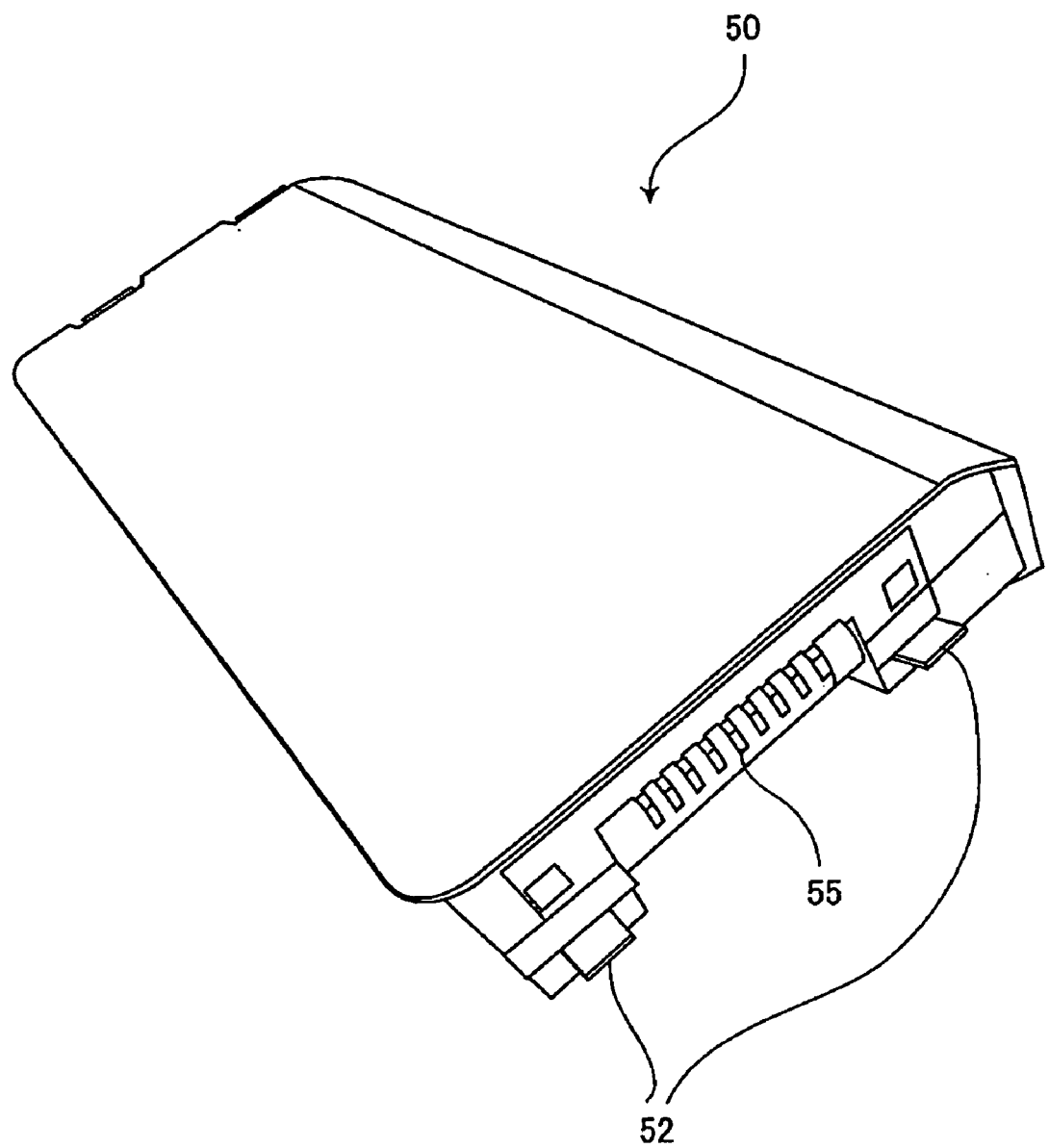
FIG. 11 is a diagram illustrating a flank of the battery pack opposite to the flank shown in FIG. 10.

FIG. 10 is a diagram illustrating one flank of the battery pack 50, and FIG. 11 is a diagram illustrating the other flank of the battery pack 50 opposite to the flank shown in FIG. 10.

As illustrated in FIG. 10, the nails 54, which are to be engaged in the concave sections 73 illustrated in FIG. 7, are provided in the flank of the battery pack 50. As illustrated in FIG. 11, in the flank of the battery pack 50 opposite to the flank shown in FIG. 10, there are provided the power output terminal 55 which is to be connected to the power input terminal 71 illustrated in FIG. 7, and outputs the power to the personal computer 10, and the projection 52 inserted into the concave section 72 of the main housing 28. The power output terminal 55 corresponds to one example of the power output terminal of the present invention, the projection 52 corresponds to one example of the "projection section provided in the battery pack" of the present invention, and the nail 54 corresponds to one example of the biasing locking nail of the present invention. The nail 54 and the projection 52 are provided in the flank, whose area is relatively small, of the battery pack 50, and both sides of the battery pack 50 in a longitudinal direction are fixed to the main housing 28, thereby, the battery pack 50 can be securely attached to the main housing 28.

As described above, according to the present embodiment, it is possible to prevent the size and the weight of the apparatus from being increased, to correctly mount the battery pack 50, and to securely prevent the backlash and the slipping off of the loaded battery pack 50.

Next, the efforts made to reduce the size and weight of the apparatus in the upper surface of the partition plate 75 illustrated in FIG. 7 will be described.

Figure 12:
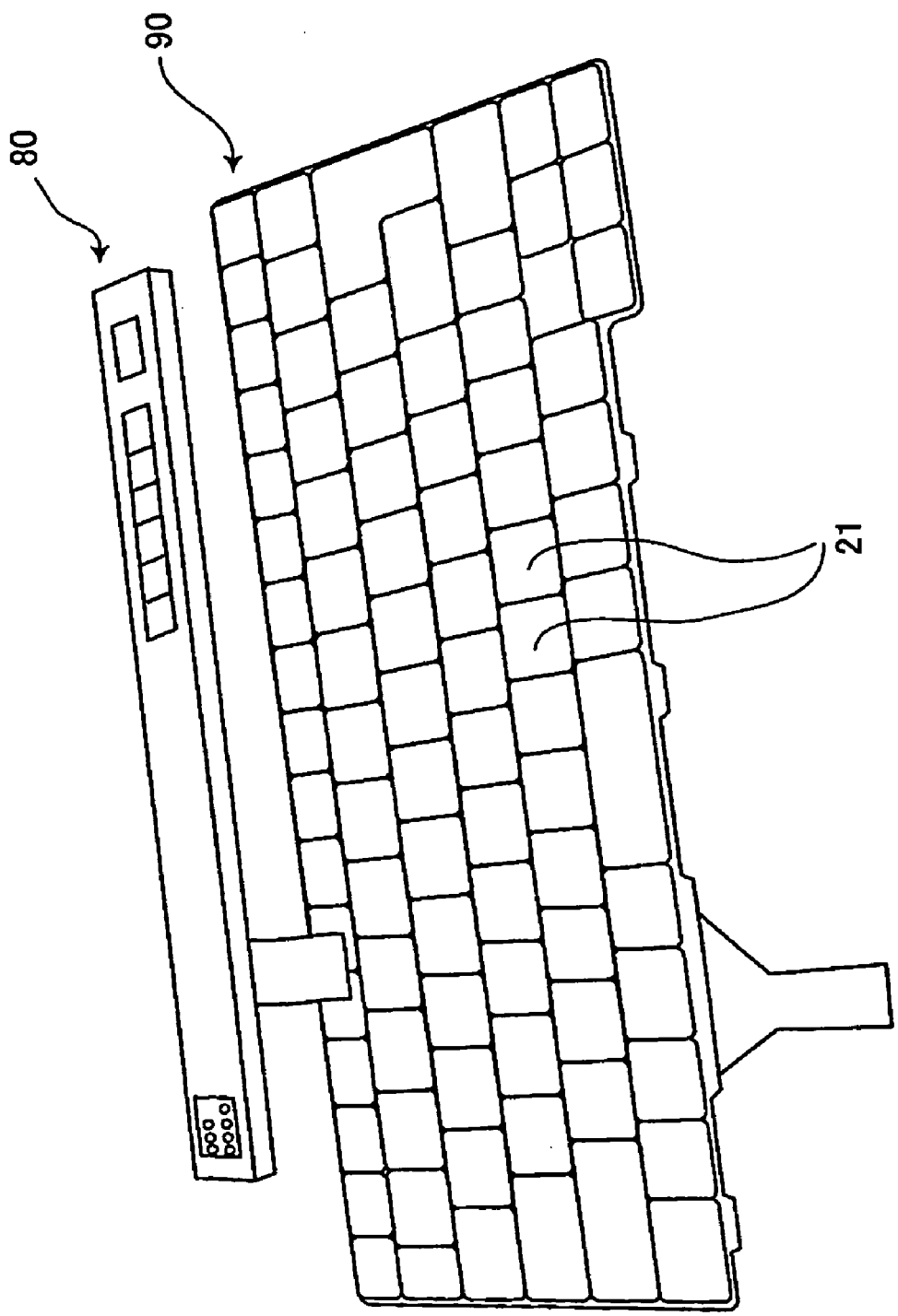
FIG. 12 is a diagram illustrating a keyboard and an operator board allocated in an upper surface of a partition plate.

FIG. 12 is a diagram illustrating the keyboard and an operator board to be disposed on the upper surface of the partition plate 75.

Disposed to be on the upper surface of the partition plate 75 are a keyboard 90 in which plural keys 21 are arranged, and an operator board 80 in which various buttons are arranged. The operator board 80 and the keyboard 90 correspond to one example of the first electronic components of the present invention, and the keyboard 90 also corresponds to one example of the keyboard of the present invention.

Figure 13:
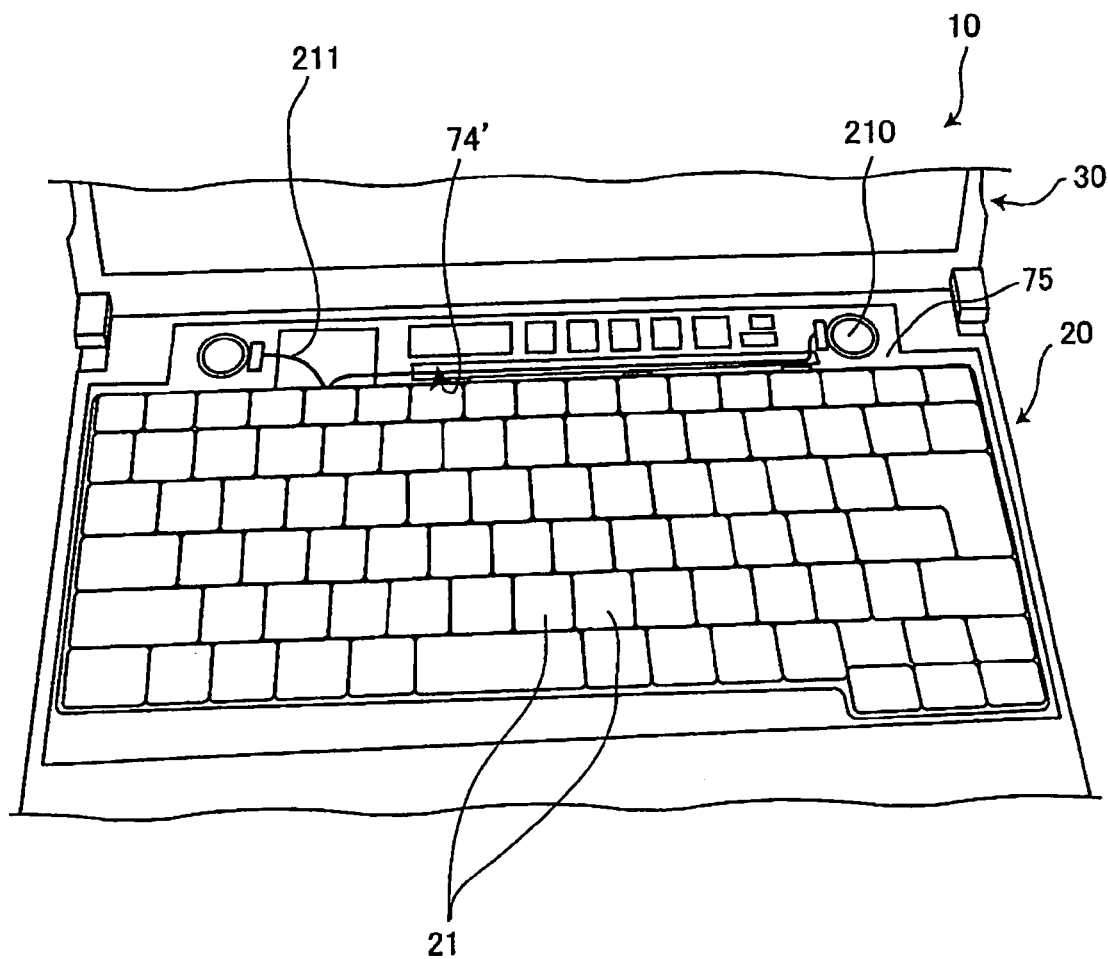
FIG. 13 is a diagram illustrating such a condition that the operator board is removed from the personal computer.
Figure 14:
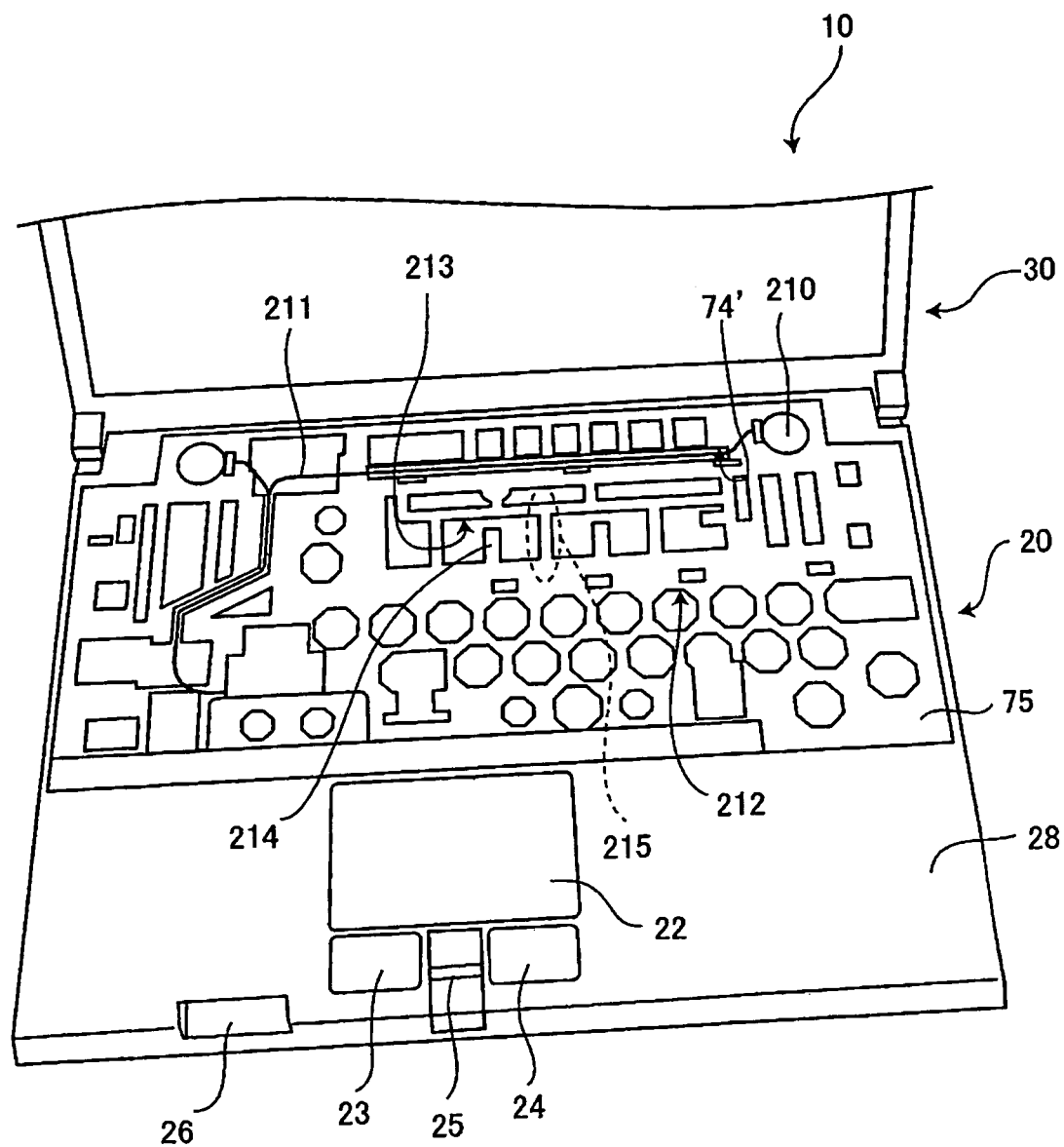
FIG. 14 is a diagram illustrating such a condition that the operator board and the keyboard are removed from the personal computer.

FIG. 13 is a diagram illustrating such a condition that the operator board 80 is removed from the personal computer 10, and FIG. 14 is a diagram illustrating such a condition that the operator board 80 and the keyboard 90 are removed from the personal computer 10.

If the operator board 80 or the keyboard 90 is removed from the personal computer 10, the upper surface of the partition plate 75 is partially exposed. On the upper surface of the partition plate 75, a speaker 210 is disposed. The speaker 210 is connected to a controlling circuit (not-illustrated) through a cable 211. The speaker 210 corresponds to one example of the second electronic component of the present invention, and corresponds to one example of the speaker of the present invention. The projection section 74 illustrated in FIG. 7 is formed by denting a corresponding part of the upper surface of the partition plate 75. This dented part is a concave section 74' formed in the upper surface of the partition plate 75. The concave section 74' corresponds to one example of the "concave section for forming the internal space" of the present invention.

Figure 15:
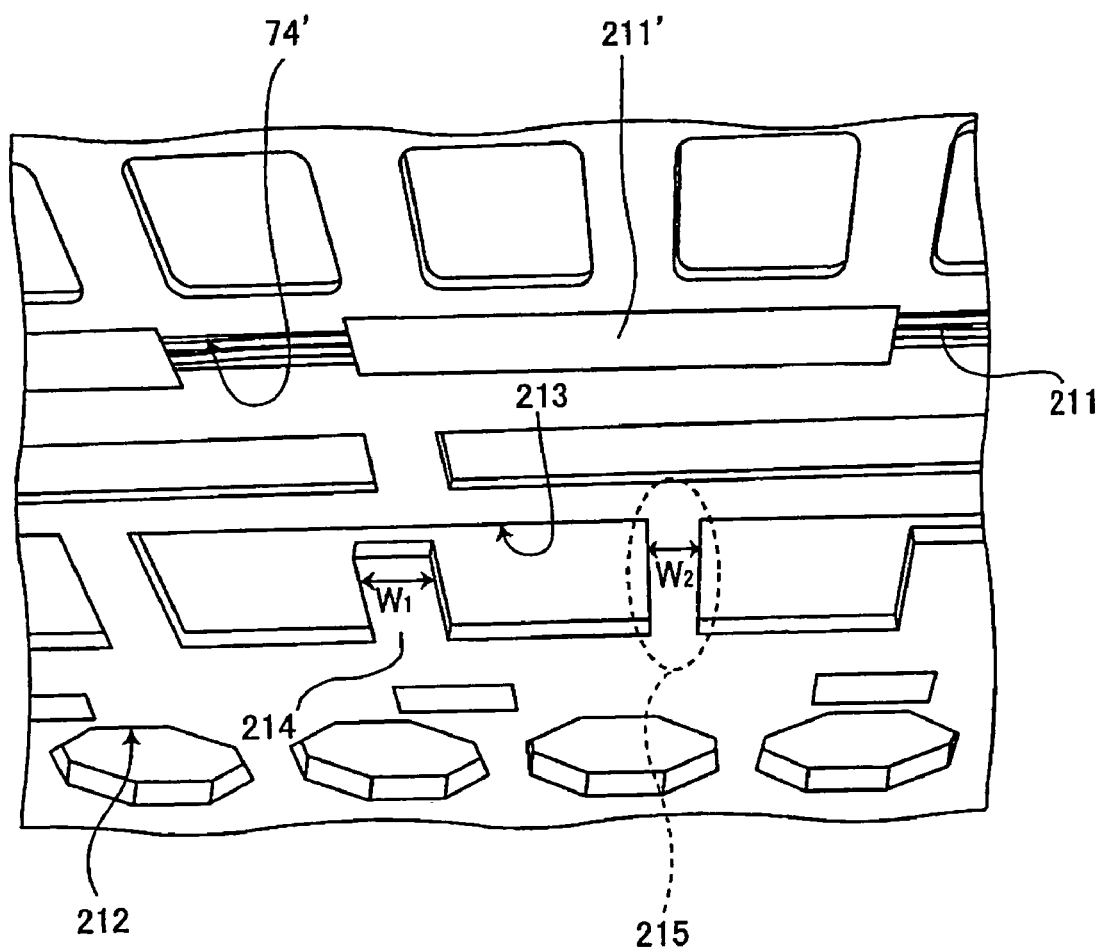
FIG. 15 is an enlarged diagram around a concave section.

FIG. 15 is an enlarged diagram around the concave section 74'.

As illustrated in FIG. 15, the cable 211 connected to the speaker 210 is disposed in the concave section 74', and the cable 211 is fixed by a tape 211' to the concave section 74'. As illustrated in FIG. 13 and FIG. 14, the cable 211 fixed to the concave section 74' is to be covered with the operator board 80 and the keyboard 90. As described above, since the concave section 74' is utilized, which is obtained by hollowing the internal space of the projection section 74 for mounting the battery pack 50, it is possible to secure the space for wiring the cable 211. In addition, since the back of the projection section 74, which is opposite to the side facing the battery pack 50, is dented, and the cable 211 is wired in the dented portion (concave section 74'), it is possible to prevent such a disadvantage that the cable 211 is damaged due to attachment and detachment of the battery pack 50.

As described above, by utilizing the internal space of the projection section 74 for positioning the battery pack 50, it is possible to secure the space for wiring the cable 211 while suppressing an increase in size and weight of the apparatus.

As illustrated in FIG. 14, plural elastic pieces 214 and plural holes 213 are provided in a part, in which the battery pack 50 is contained, of the partition plate 75. Housing parts 215 formed between the plural holes 213 and the elastic pieces 214 are alternately provided. The elastic piece 214 corresponds to one example of the elastic piece of the present invention, and the housing part 215 corresponds to one example of the "part, which exists between the holes, of the housing" of the present invention.

Figure 16:
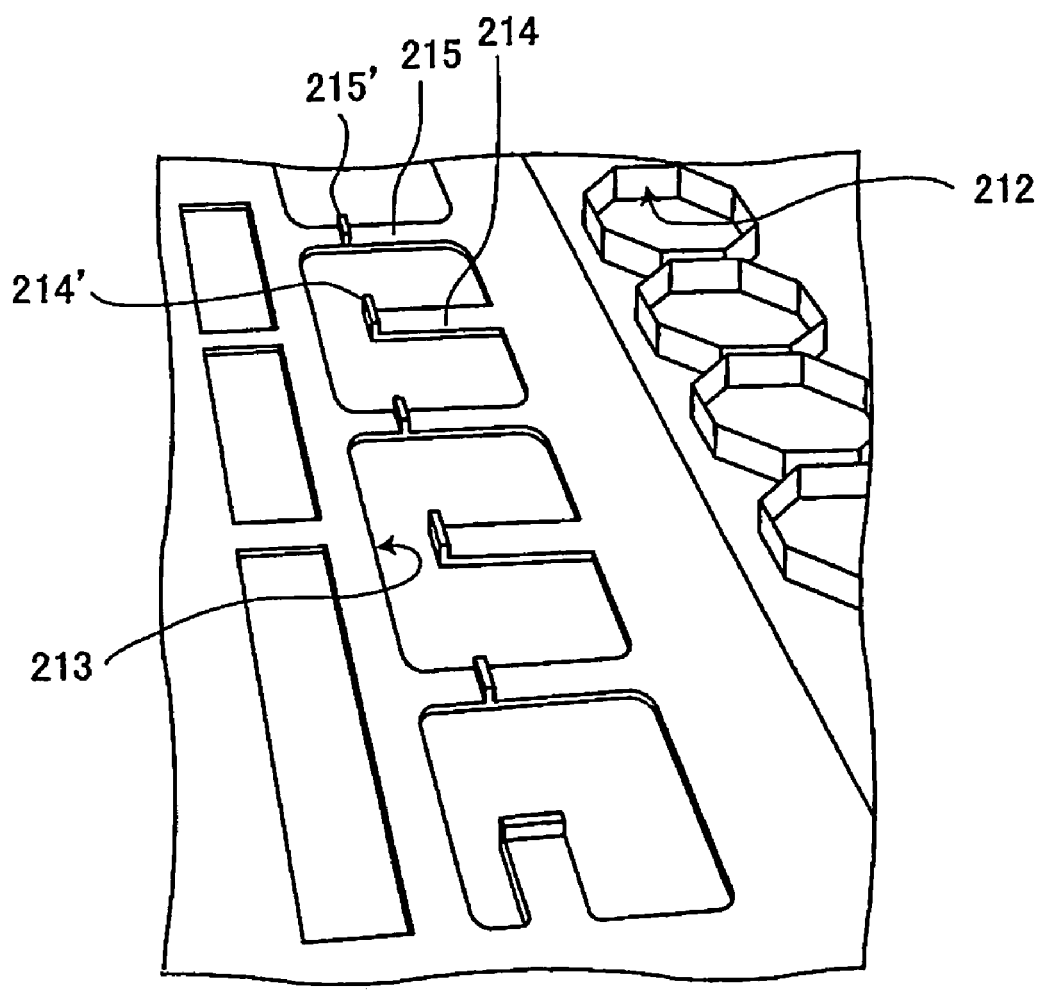
FIG. 16 is a diagram illustrating an underside, which faces the battery pack, of the partition plate.
Figure 17:
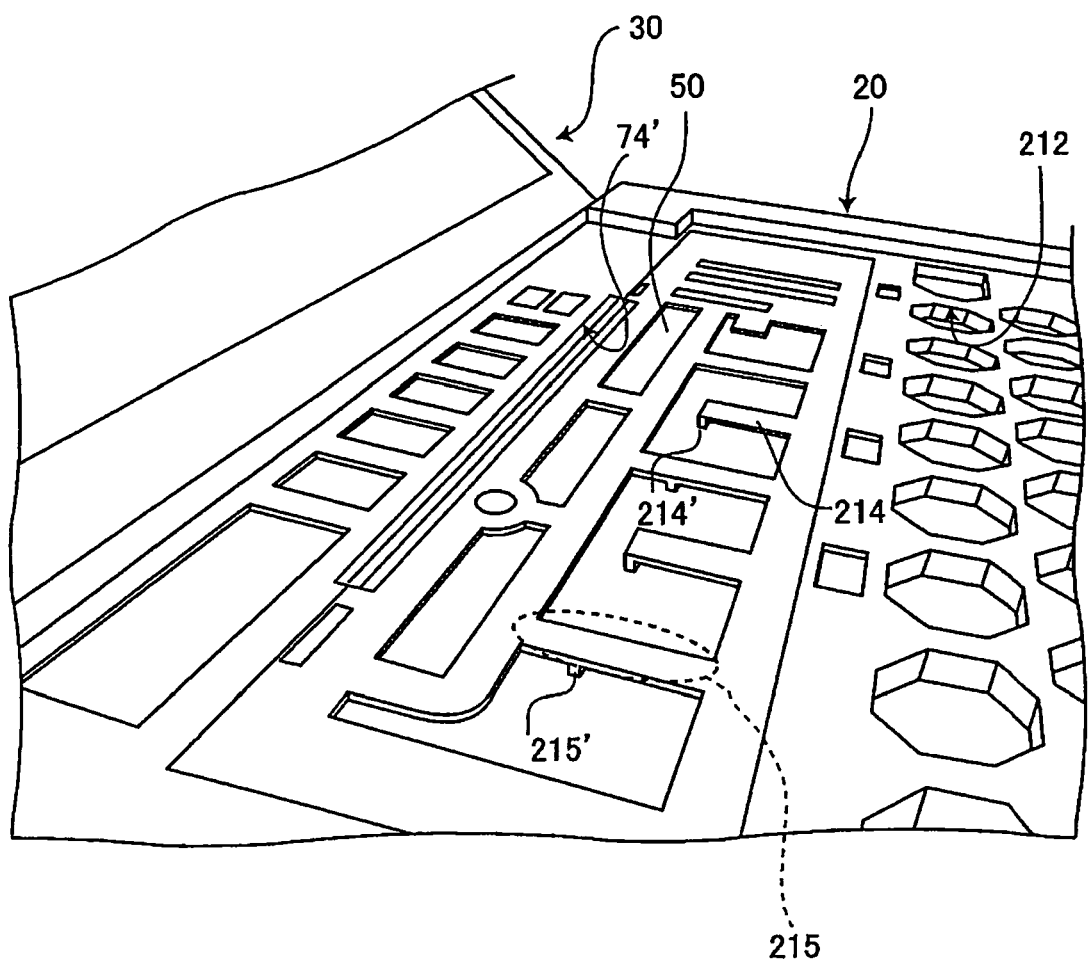
FIG. 17 is a diagram illustrating the upper surface of the partition plate while the battery pack is accommodated.

FIG. 16 is a diagram illustrating the underside, which faces the battery pack 50, of the partition plate 75, and FIG. 17 is a diagram illustrating the upper surface of the partition plate 75 while the battery pack 50 is contained.

As illustrated in FIG. 16, projections 214' and 215', which are extended as directing to the battery pack 50, are provided in the elastic piece 214 and the housing part 215, and an extension length of the projection 214' of the elastic piece 214 is larger than that of the projection 215' of the housing part 215. The projection 214' of the elastic piece 214 corresponds to one example of the first projection section of the present invention, and the projection 215' of the housing part 215 corresponds to one example of the second projection section of the present invention.

As illustrated in FIG. 17, the elastic piece 214 and the housing part 215 are provided with the projections 214' and 215' which are extended as directing from each part to the battery pack 50, and the projections 214' and 215' are designed so that a predetermined clearance is provided between each projection and the battery pack 50 while the battery pack 50 is contained. That is, since the extension length of the projection 214' of the elastic piece 214 is larger than that of the projection 215' of the housing part 215, the projections 214' and 215' are designed so that the clearance formed between the projection 214' and the battery pack 50 is narrower than the clearance formed between the projection 215' of the housing part 215 and the battery pack 50.

The size of an external shape of the battery pack 50 may be different from the specification because of the production variation. When the size of an external shape of the battery pack 50 is slightly larger than the specification because of such a production variation, in the present embodiment, only the projection 214' of the elastic piece 214 contacts the battery pack 50, and the battery pack 50 is appropriately held by absorbing a size error of the battery pack 50. As described above, since the housing part 215 and the battery pack 50 do not contact each other, it is possible to prevent the battery pack 50 from being damaged and to prevent the personal computer 10 from failing due to the contact between the battery pack 50 and the housing part 215. According to the present embodiment, since the battery pack 50 is biased by the projection 214' of the elastic piece 214, it is possible to securely suppress the backlash of the battery pack 50.

The keyboard 90 illustrated in FIG. 12 is to be disposed above the elastic piece 214 and the housing part 215. According to the present embodiment, since the size error of the battery pack 50 is absorbed only by the elastic piece 214 while the battery pack 50 does not contact the housing part 215, a user, which operates the keyboard 90 mounted on the housing part 215, is provided with the keying sense without the discomfort. The keyboard 90 functions to prevent the elastic piece 214 from being unlimitedly pushed and bent.

When the size of an external shape of the battery pack 50 is further larger than the design specification, in the present embodiment, the battery pack 50 contacts the elastic piece 214 and the housing part 215. The elastic piece 214 is extended from the partition plate 75, and only one end is connected to the partition plate 75, and on the other hand, both ends of the housing part 215 are connected to the partition plate 75. Thus, if the width of the elastic piece 214 is the same as that of the housing part 215, the elastic force generated by the elastic piece 214 is small. As illustrated in FIG. 15, in the present embodiment, a width W1 of the elastic piece 214 is formed wider than a width W2 of the housing part 215. Thus, the elastic piece 214 and the housing part 215 are equally deformed in shape so that the elastic forces generated by both parts are equal to each other. As a result, the backlash of the battery pack 50 can be suppressed by the uniform force. Since the key 21 is supported from back by the elastic piece 214 and the housing part 215, pressing each key 21 can provide the same click sense.

As described above, in the present embodiment, when the size error of the battery pack 50 is small, only the projections 214' of the elastic piece 214, which can be changed in shape independently from the partition plate 75 (housing), contacts the battery pack 50, and absorbs the size error of the battery pack 50. Therefore, the discomfort that the user is likely to feel when operating the keyboard 90 is removed. When the size error of the battery pack 50 is large, since both of the projections 214' of the elastic piece 214 and the projections 215' of the housing part 215 contact the battery pack 50, both of the projections 214' of the elastic piece 214 and the projections 215' of the housing part 215 function so as to counteract the battery pack 50 by means of the strong elastic forces, and absorb the size error.

Here, as illustrated in FIG. 14, the plural octagonal holes 212 are provided at positions corresponding to some of the keys 21 of the keyboard 90, of the partition plate 75. The hole 212 corresponds to one example of "the hole of the housing" of the present invention.

Figure 18:
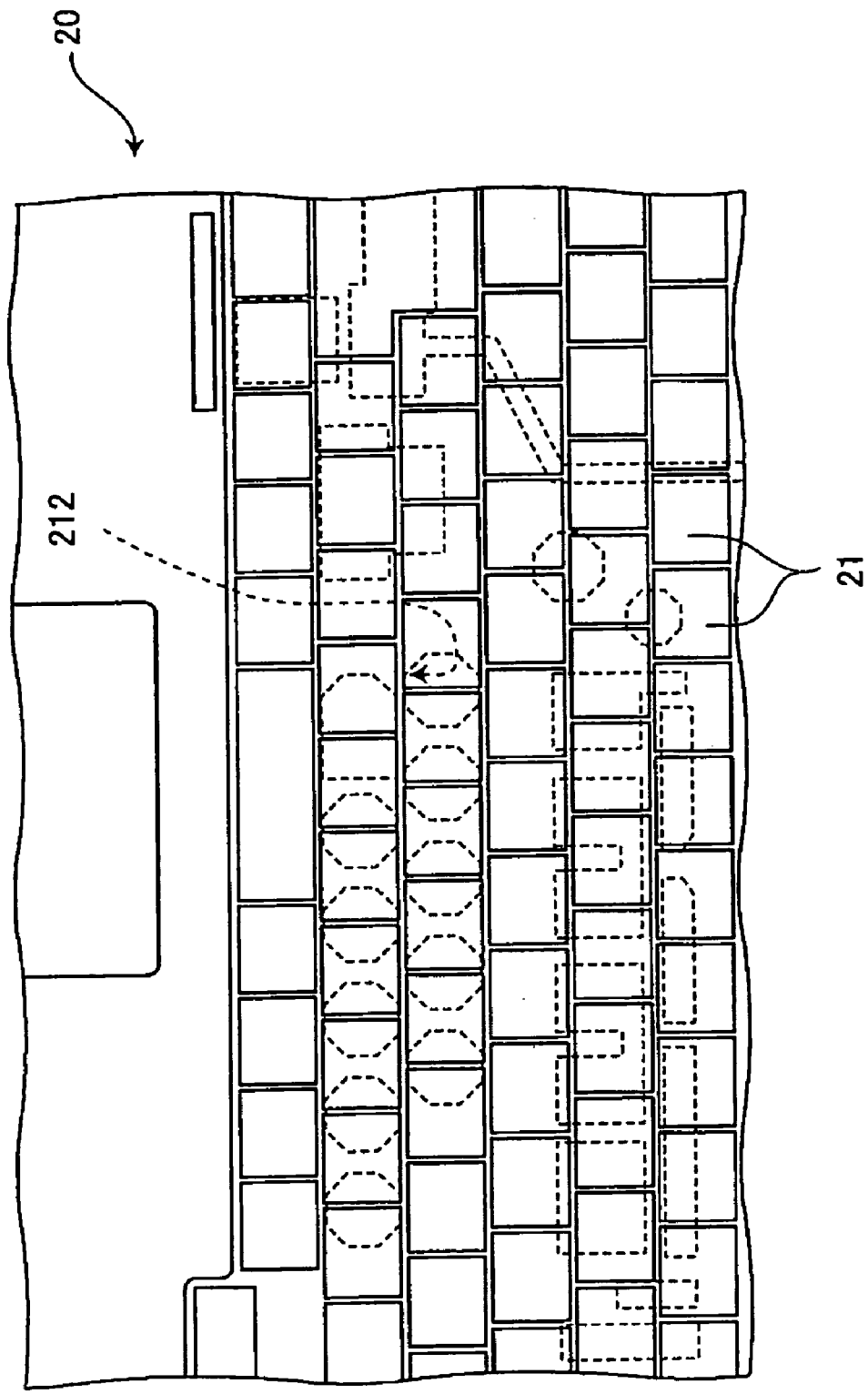
FIG. 18 is a diagram illustrating a positional relation between keys and holes.

FIG. 18 is a diagram illustrating a positional relation between the key 21 and the hole 212.

As illustrated in FIG. 18, a shape of the plural keys 21 configured in the keyboard 90 is square, and the hole 212 is formed so that the upper and lower sides of the octagonal shape are aligned to the upper and lower sides of two adjacent keys 21, and the left side of the one of the adjacent keys 21 and the right side of the other of the adjacent keys 21 pass through the central part of the octagonal shape. As a result, the center of the key 21 is positioned above a part of the partition plate 75 existing between the adjacent holes 212, so that it is possible to reduce the weight of the partition plate 75 while maintaining the strength, and to prevent the keyboard 90 from being bent while maintaining the click sense that the user can feel when pressing the key 21.

As described above, according to the present embodiment, it is possible to reduce the weight of the apparatus while maintaining the strength for fixing the keyboard 90.

As illustrated in FIG. 16, in addition to the octagonal hole 212, the partition plate 75 is provided with an octagonal frame, whose shape is the same as that of the hole 212, in the underside facing the battery pack 50. This octagonal frame makes the housing further stronger, and contributes to an increase in the strength for fixing the keyboard 90.

Next, various efforts made in the underside of the partition plate 75 illustrated in FIG. 7 will be described.

The battery pack 50 is mounted in a position close to the underside, which is opposite to the upper surface where the keyboard 90 is mounted, of the partition plate 75, and various electronic components such as the CPU 101 and the hard disk device 103 are also mounted there.

Figure 19:
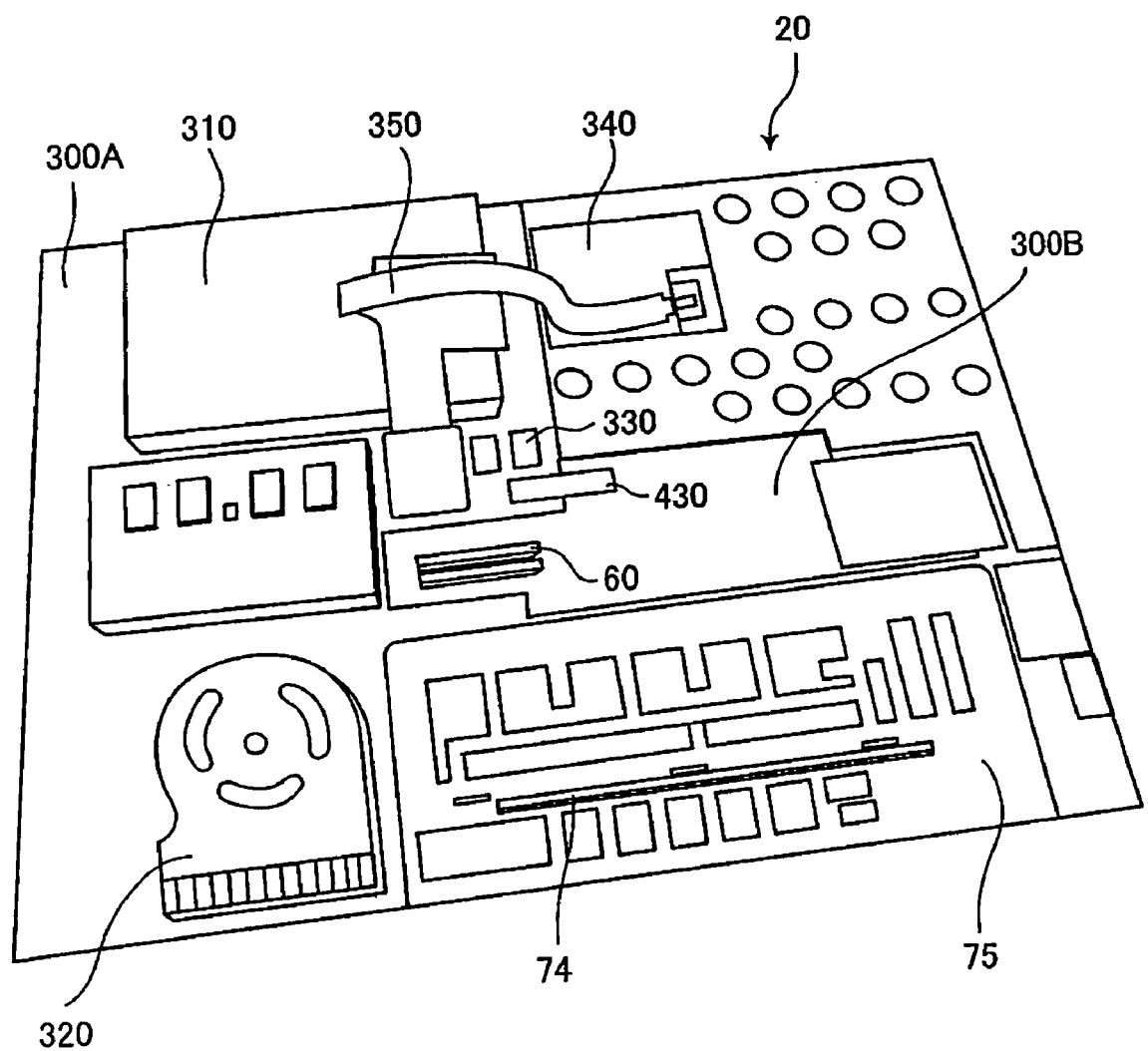
FIG. 19 is a diagram illustrating an underside of the partition plate.

FIG. 19 is a diagram illustrating the underside of the partition plate 75.

The underside of the partition plate 75 is sectioned with ribs or the like to make spaces in which the electronic components are to be engaged. After the electronic components are fixed to the underside of the partition plate 75, the lower case 28B illustrated in FIG. 8 is attached so that the electronic components are housed. The combination of the partition plate 75 and the upper case 28A corresponds to one example of the housing frame of the present invention, and the lower case 28B corresponds to one example of the housing cover of the present invention. A motherboard 300A is screwed onto the partition plate 75, and an auxiliary board 300B is laid on the motherboard 300A. Further, a cooling fan 320, a hard disk 310 (corresponding to the hard disk device 103 illustrated in FIG. 6), a controlling circuit 340, an IC chip 330, and the like are mounted on the motherboard 300A. The expansion connector 60, which is also illustrated in FIG. 5, projects from the auxiliary board 300B. The hard disk 310 and the controlling circuit 340 are connected by a folded flexible printed board 350, and the electronic components on the motherboard 300A and the electronic components on the auxiliary board 300B are also connected by a flexible printed board 430.

Figure 20:
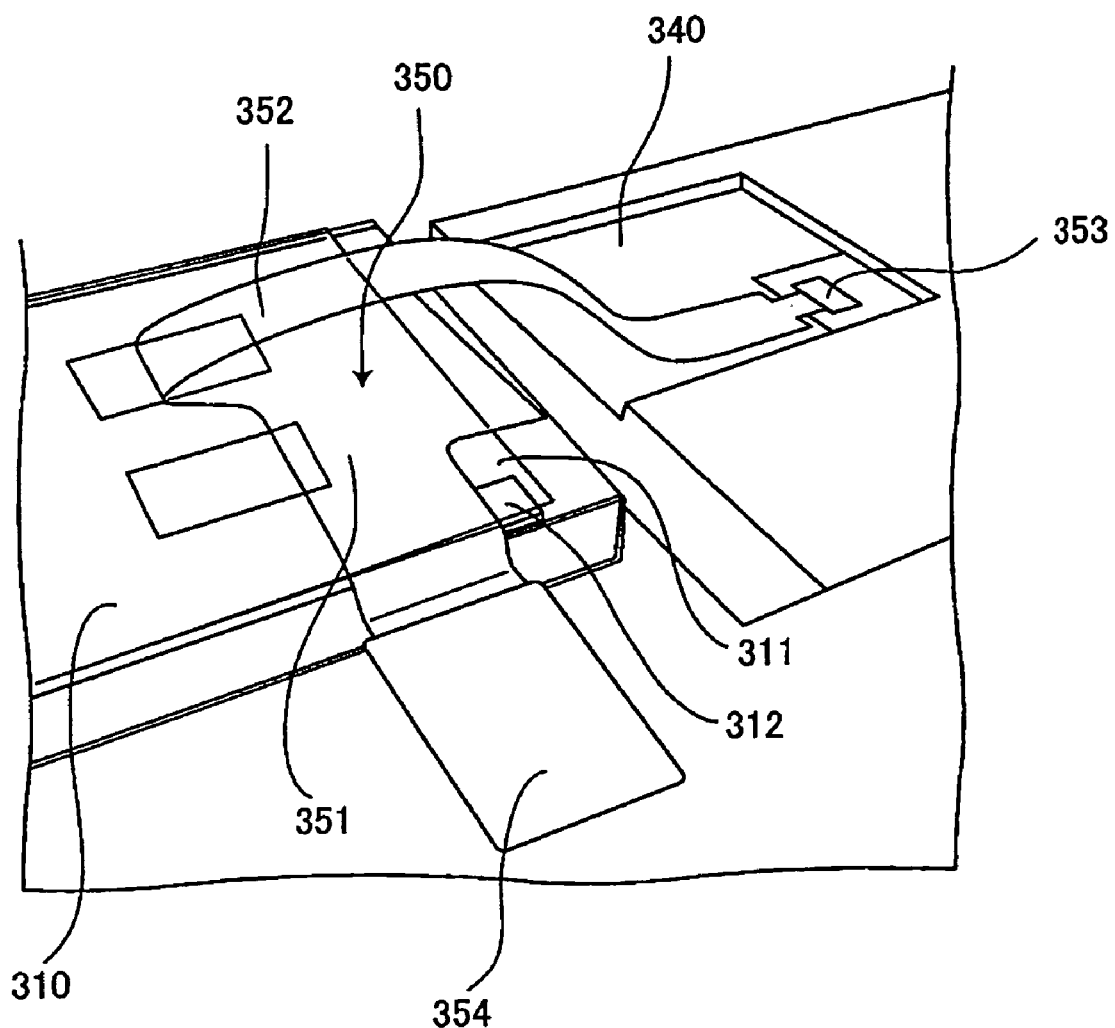
FIG. 20 is an enlarged diagram around a flexible printed board.

FIG. 20 is an enlarged diagram around the flexible printed board 350.

The flexible printed board 350 includes a first connector (not-illustrated) connected to a connector (not-illustrated) of the hard disk 310, and further includes a wide section 351 which is bent toward the back of the personal computer 10 while the first connector is connected to the hard disk 310. The flexible printed board 350 further includes: an extended section 352 which is first turned in a direction from the wide section 351 to a point for connection with the hard disk 310 and runs over the wide section 351 toward the controlling circuit 340; a second connector 353 connected to a connector of the controlling circuit 340; and a reinforcing plate 354 which extends from the wide section 351 in a direction intersecting the extended section 352. The hard disk 310 and the flexible printed board 350 are contained in a box-like plastic case 311 in which a buffer material 312 is provided. The reinforcing plate 354 and the extended section 352 of the flexible printed board 350 are exposed outside the plastic case 311 through a cutout provided on a boundary line between the upper surface and the flank of the plastic case 311, and are connected to the controlling circuit 340 and the like. The plastic case 311 will be described later in detail. The flexible printed board 350 corresponds to one example of the flexible board of the present invention, and the reinforcing plate 354 corresponds to one example of the reinforcing plate of the present invention.

Figure 21:
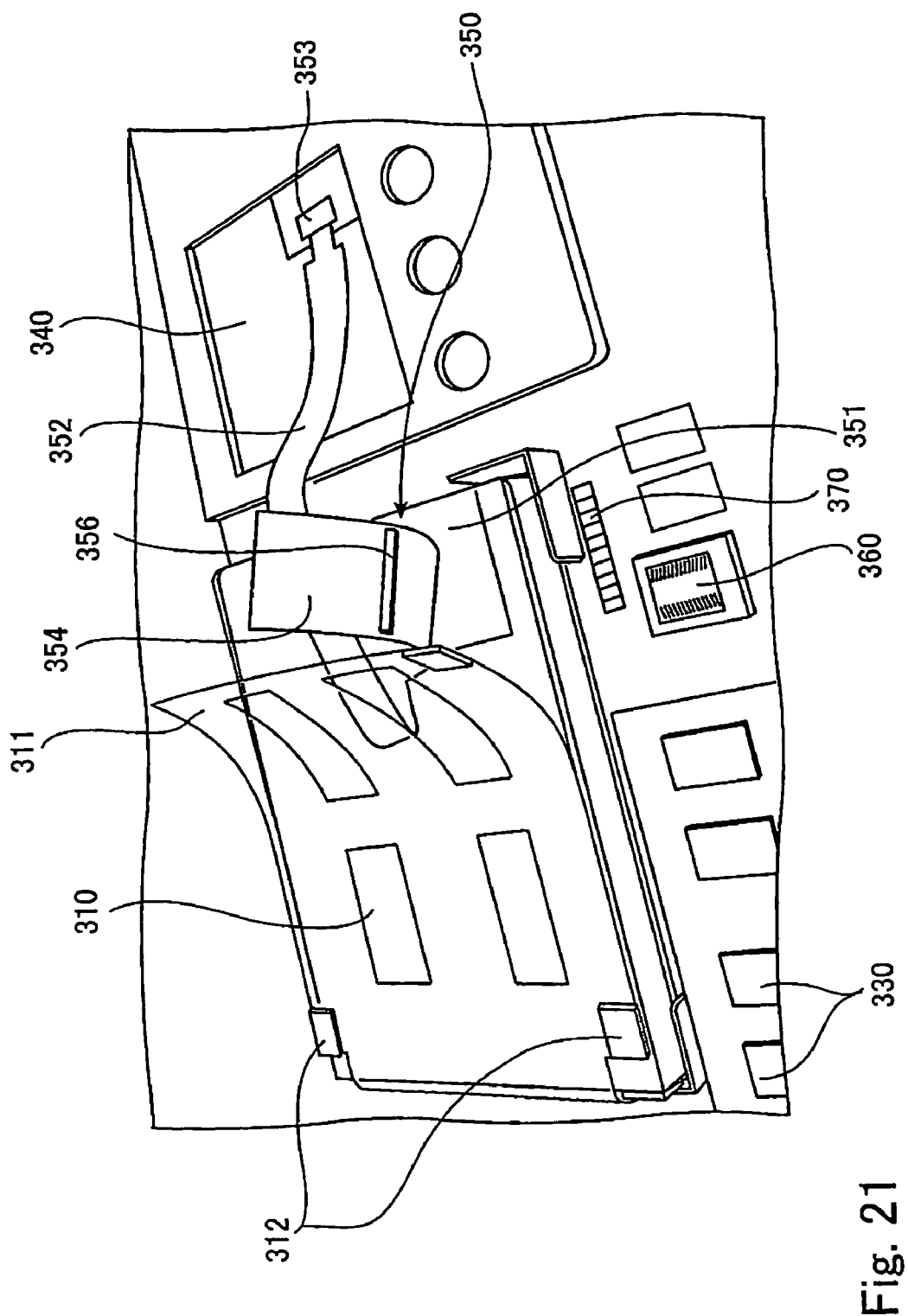
FIG. 21 is a diagram illustrating such a condition that a reinforcing plate of the flexible printed board is partially turned over.

FIG. 21 is a diagram illustrating such a condition that the reinforcing plate 354 of the flexible printed board 350 is turned over.

An additional IC chip 360, which is selectively added only when a security function is added, is also mounted on the motherboard 300A in addition to an IC chip 330 which is normally mounted on personal computers of the same model. A third connector 356, which is connected to a connector 370 mounted on the motherboard 300A, is provided in the reinforcing plate 354 of the flexible printed board 350, and the reinforcing plate 354 is extended further longer than the position at which the third connector 356 is provided, and covers the additional IC chip 360. Thus, without fixing the additional IC chip 360 by using a screw or solder, it is possible to prevent the additional IC chip 360 from dropping out. The connector 370 mounted on the motherboard 300A corresponds to one example of the first connection section of the present invention, the third connector 356 of the flexible printed board 350 corresponds to one example of the second connection section of the present invention, and the additional IC chip 360 corresponds to one example of the "component selectively mounted on the board" of the present invention.

Figure 22:
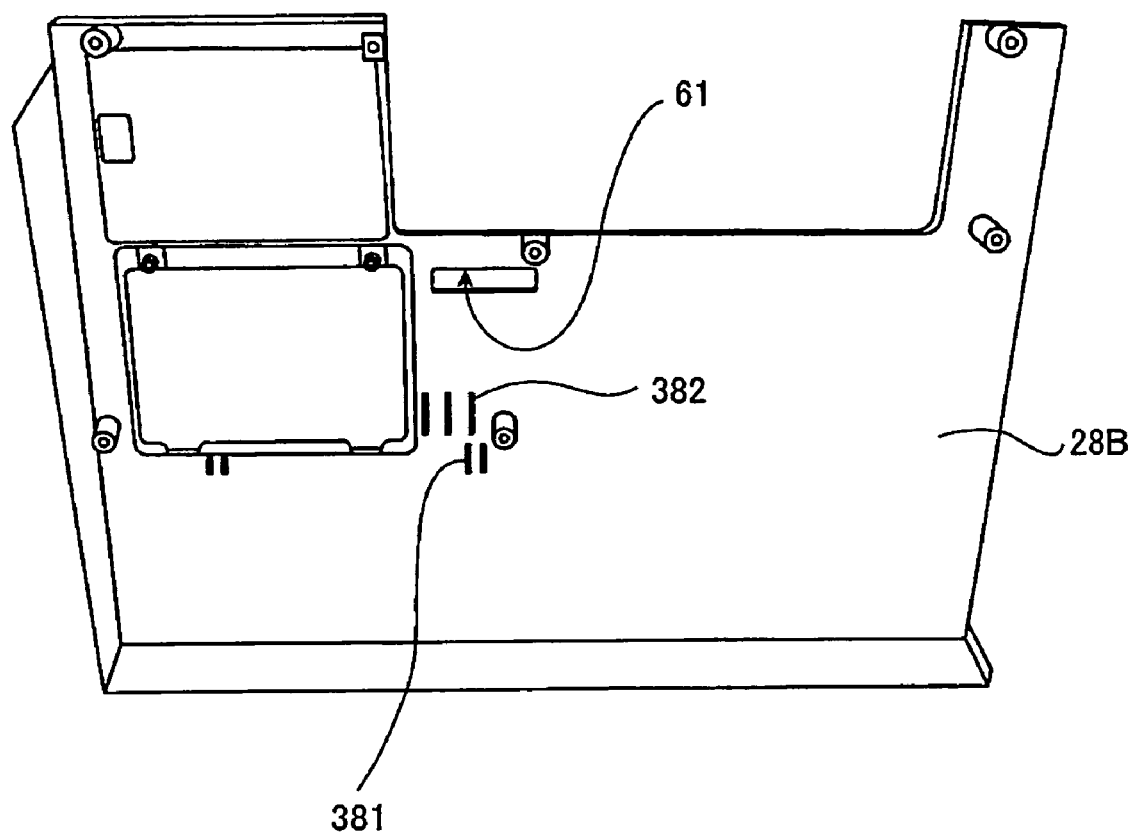
FIG. 22 is an upper surface diagram of the lower case.

FIG. 22 is an upper surface diagram of the lower case 28B illustrated in FIG. 8.

Disposed on the upper surface of the lower case 28B are a first projection 381 and a second projection 382. The second projection 382 is provided at a position that corresponds to the connector 370 of the motherboard 300A when the lower case 28B is attached to the upper case 28A, and the first projection 381 is provided at a position that corresponds to a position where the additional IC chip 360 is mounted when the lower case 28B is attached to the upper case 28A. Each of the first projection 381 and the second projection 382 corresponds to one example of "the projection section which abuts the reinforcing plate" of the present invention.

The motherboard 300A and the auxiliary board 300B illustrated in FIG. 19 are pressed by screws or the like from the upper surface of the lower case 28B, and various IC chips 330 are soldered to the motherboard 300A and the auxiliary board 300B. When an optional function is added, the additional IC chip 360 is connected to the motherboard 300A, and the lower case 28B is mounted while being covered by the reinforcing plate 354 of the flexible printed board 350. As a result, the first projection 381 of the lower case 28B presses, via the reinforcing plate 354, the connector 370 of the motherboard 300A and the third connector 356 of the flexible printed board 350, and the second projection 382 of the lower case 28B presses, via the reinforcing plate 354, the additional IC chip 360. As described above, according to the present embodiment, only by attaching the lower case 28B, it is possible to easily and securely prevent the additional IC chip 360 from dropping out.

As also illustrated in FIG. 21, the hard disk 310 is contained in the box-like plastic case 311 in which the buffer material 312 is provided. The plastic case 311 corresponds to one example of the box-like case of the present invention.

Figure 23:
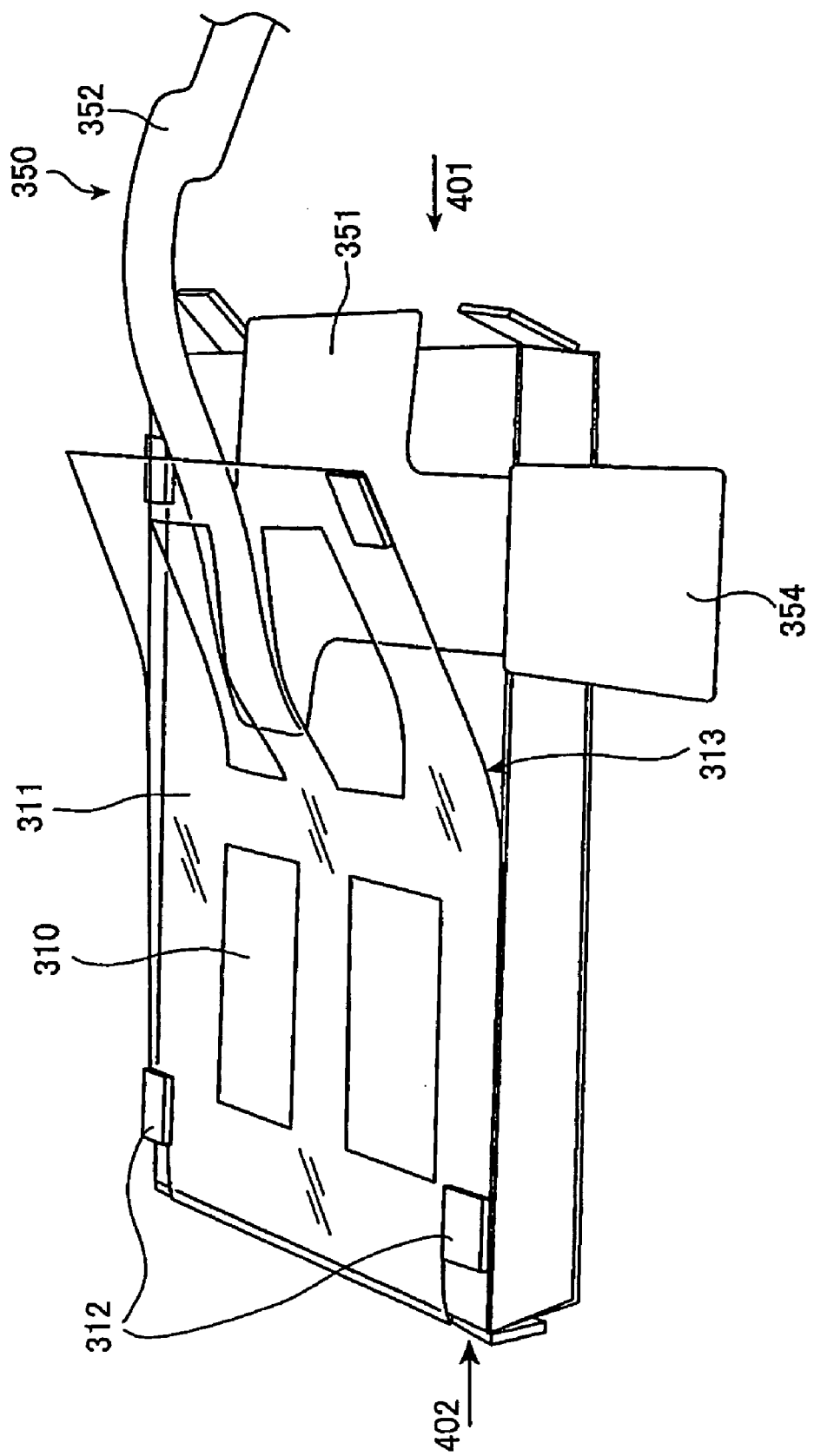
FIG. 23 is a diagram illustrating an underside, which faces a lower cover, of a hard disk to which the flexible printed board is connected.
Figure 24:
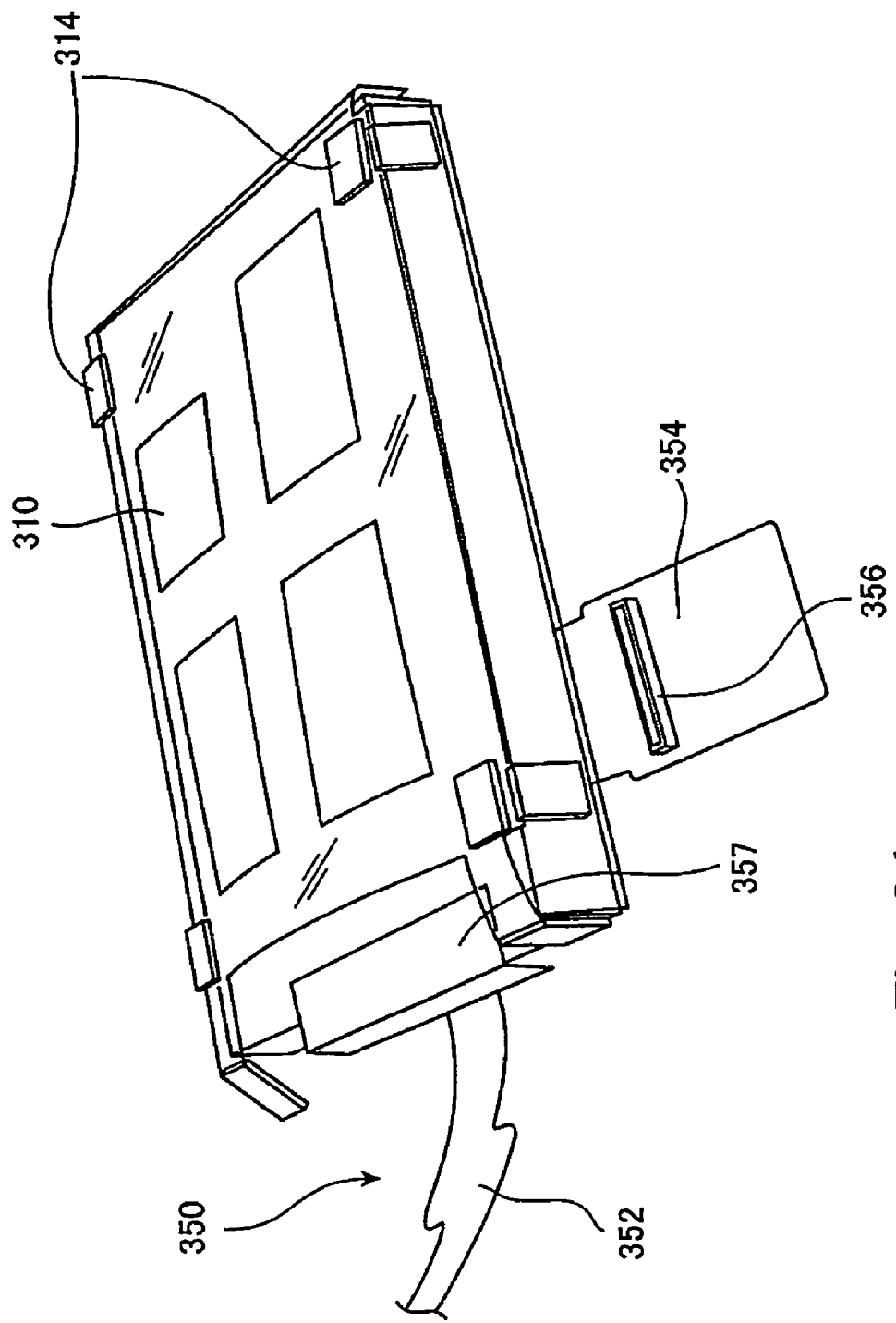
FIG. 24 is a diagram illustrating an upper surface of the hard disk.

FIG. 23 is a diagram illustrating the underside, which faces the lower case 28B, of the hard disk 310 to which the flexible printed board 350 is connected, and FIG. 24 is a diagram illustrating the upper surface of the hard disk 310.

As described above, the folded flexible printed board 350 is connected to the hard disk 310. In the flexible printed board 350, the wide section 351 spreads on the side, which faces the lower case 28B, of the hard disk 310, the extended section 352 is folded to run over the wide section 351, and the reinforcing plate 354 projects from the wide section 351 in a direction crossing the extended section 352. The wide section 351 corresponds to one example of the first section of the present invention, the extended section 352 corresponds to one example of the second section of the present invention, and the reinforcing plate 354 corresponds to one example of the third section of the present invention.

The plural buffer materials 312 and 314 are provided on the sides, which face the underside and the upper surface of the hard disk 310 respectively, of the plastic case 311. In the underside, a cutout 313, which is used to pull up, is provided from one flank 401, in which the connector of the hard disk 310 is provided, to the other flank 402, which is an opposite side of the flank 401. Since the cutout 313 is provided, it is possible to easily contain the flexible printed board 350 in the plastic case 311. The buffer material 312 contacting the back cover 32B corresponds to one example of the second buffer material of the present invention, and the buffer material 314 facing the partition plate 75 corresponds to one example of the first buffer material of the present invention.

According to the present embodiment, since the flexible printed board 350 connected to the hard disk 310 lies while being folded between the hard disk 310 and the back cover 32B, when the personal computer 10 falls, or the like, the flexible printed board 350 absorbs the impact as a cushion. Thus, it is possible to reduce the impact applied to the hard disk 310 without providing a large amount of buffer material, and to prevent troubles such as failure and breakage of the hard disk 310.

Next, the expansion connector 60 illustrated in FIG. 19 will be described in detail.

As described in FIG. 19, the auxiliary board 300B is laid on the motherboard 300A, the expansion connector 60 projects from the auxiliary board 300B, and as illustrated in FIG. 5, the expansion connector 60 is exposed from the through hole 61 of the main housing 28.

Figure 25:
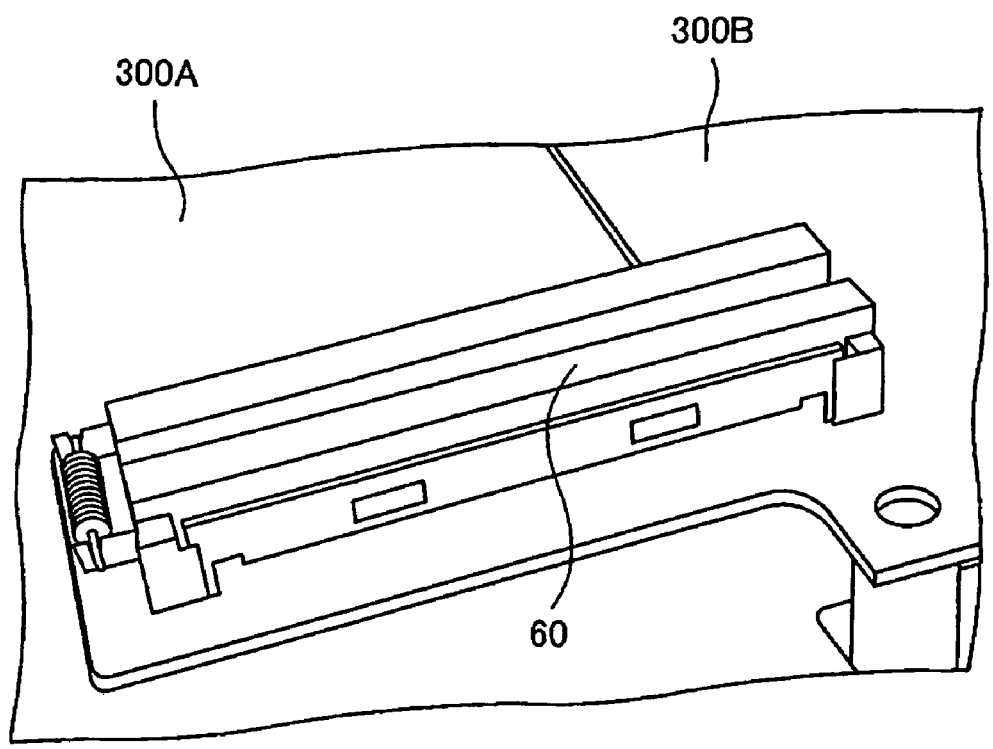
FIG. 25 is an enlarged diagram around a connector for the expansion.

FIG. 25 is an enlarged diagram around the expansion connector 60.

As shown in FIG. 25, there is a difference in height between the motherboard 300A and the auxiliary board 300B, and the auxiliary board 300B is disposed closer to the lower case 28B as compared with the motherboard 300A.

Figure 26:
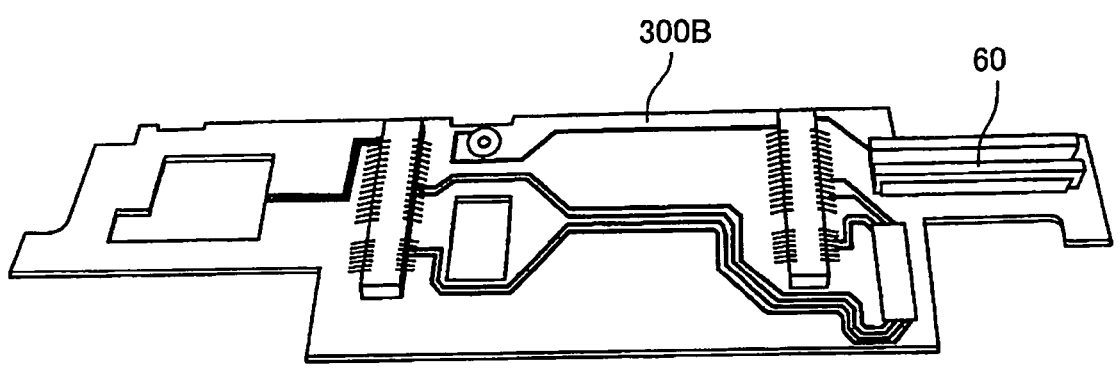
FIG. 26 is a diagram illustrating the underside, which faces a lower cover, of an auxiliary board.
Figure 27:
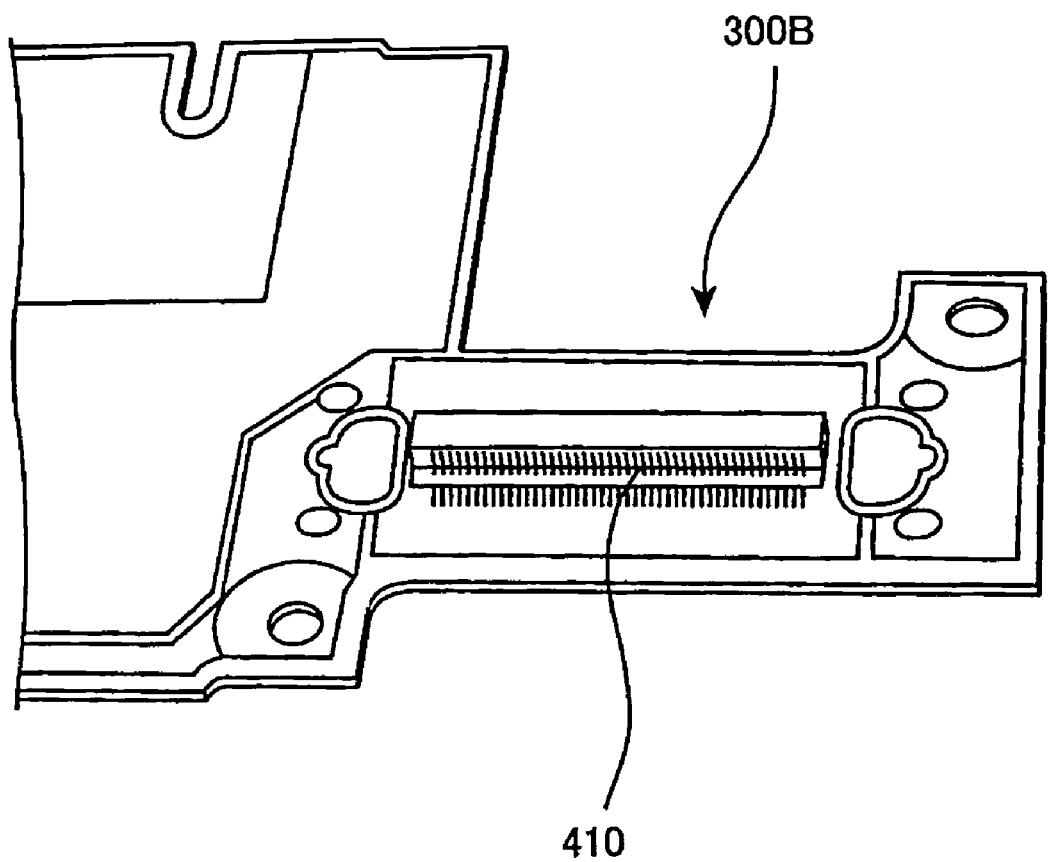
FIG. 27 is a diagram illustrating an upper surface of the auxiliary board.

FIG. 26 is a diagram illustrating the underside, which faces the lower case 28B, of the auxiliary board 300B, and FIG. 27 is a diagram illustrating the upper surface of the auxiliary board 300B.

The expansion connector 60 is mounted on the undersurface of the auxiliary board 300B, and a coupling connector 410, which is overlapped with the expansion connector 60 across the auxiliary board 300B, is mounted on the upper surface of the auxiliary board 300B. The expansion connector 60 corresponds to one example of the third connector of the present invention, the coupling connector 410 corresponds to one example of the second connector of the present invention, and the auxiliary board 300B corresponds to one example of the second board of the present invention.

Figure 28:
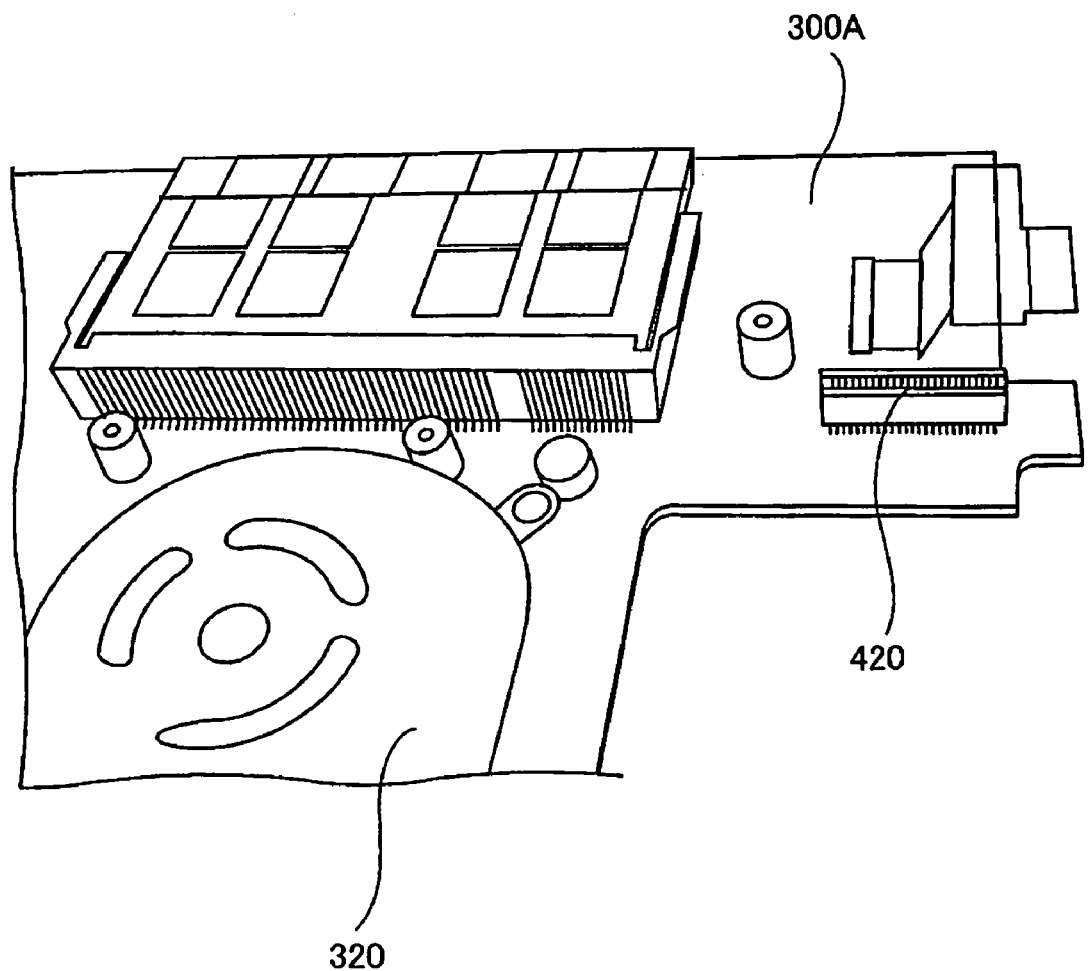
FIG. 28 is a diagram illustrating a motherboard while the auxiliary board is removed.

FIG. 28 is a diagram illustrating the motherboard 300A while the auxiliary board 300B is removed.

A main-unit-side connector 420 is mounted in the underside, which faces the lower case 28B, of the motherboard 300A. To the main-unit-side connector 420, the coupling connector 410 illustrated in FIG. 27 of the auxiliary board 300B is to be connected. The main-unit-side connector 420 corresponds to one example of the first connector of the present invention, and the motherboard 300A corresponds to one example of the first board of the present invention.

When the auxiliary board 300B is connected to the motherboard 300A, the coupling connector 410 of the auxiliary board 300B is coupled with the main-unit-side connector 420 of the motherboard 300A, the main-unit-side connector 420, the auxiliary board 300B, and the expansion connector 60 are stacked and combined. Therefore, there is no need to particularly provide a long connector which can directly connect the motherboard 300A with the port replicator, and the port replicator can be securely connected with suppressed manufacturing costs.

Figure 29:
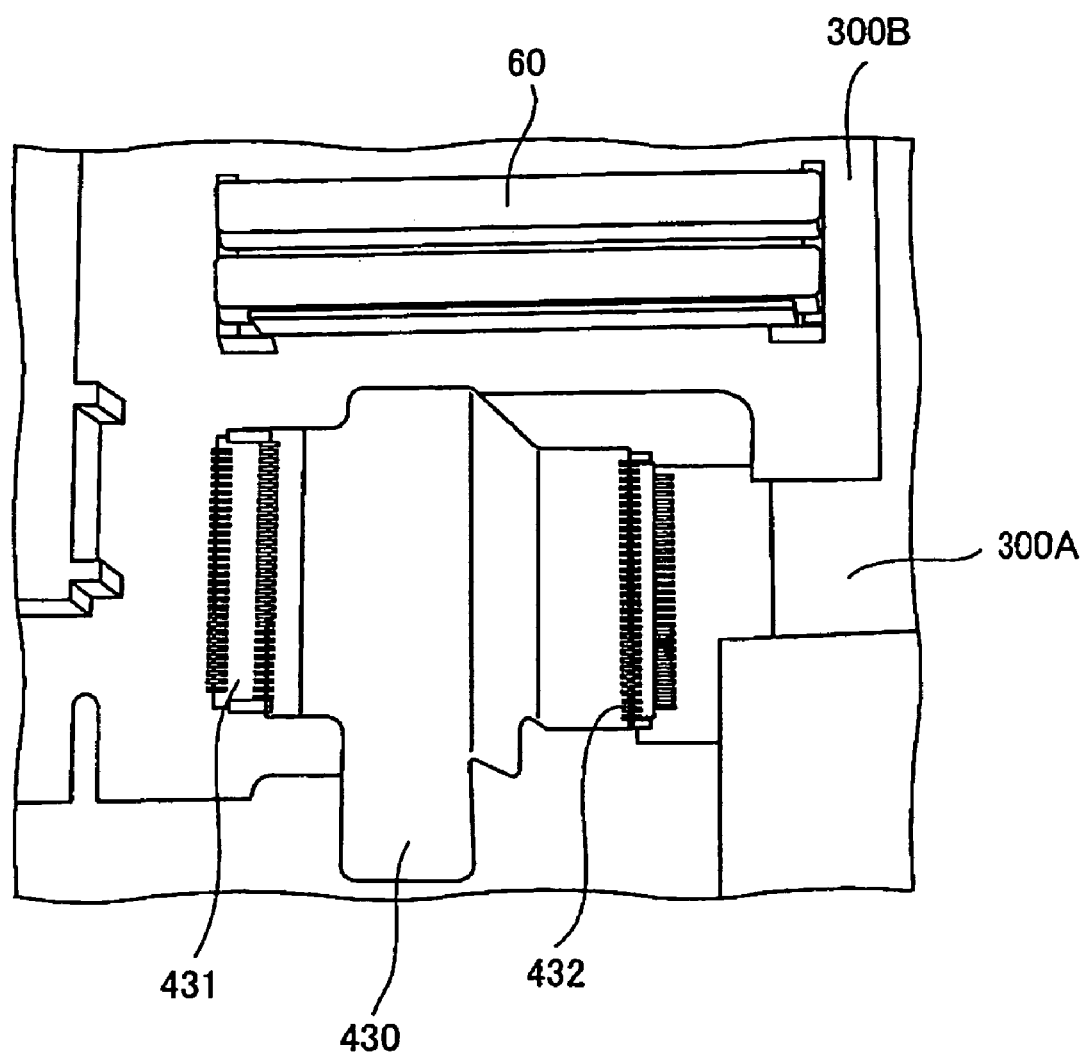
FIG. 29 is an enlarged diagram around the connector for the expansion.

FIG. 29 is an enlarged diagram around the expansion connector 60.

As illustrated in FIG. 29, in addition to the main-unit-side connector 420, the auxiliary board 300B, and the expansion connector 60, connectors 431 and 432, which mutually connect the electronic components mounted on each board by using the flexible printed board 430, are provided on the motherboard 300A and the auxiliary board 300B. The flexible printed board 430 corresponds to one example of the signal line of the present invention.

Since the flexible printed board 430 connects the electronic components mounted on each of the motherboard 300A and the auxiliary board 300B, it is possible to efficiently utilize the space formed by the difference in height, and to downsize the apparatus.

Figure 30:
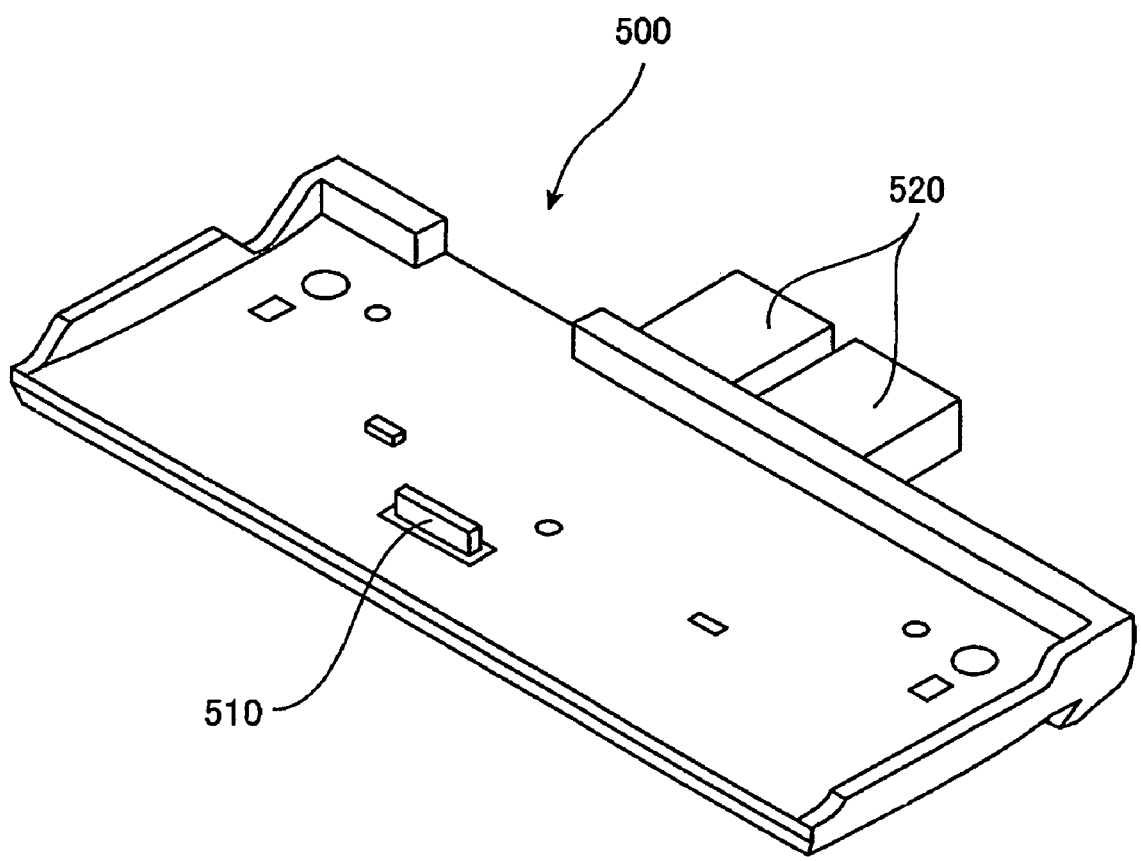
FIG. 30 is an exterior appearance diagram of a port replicator.
Figure 31:
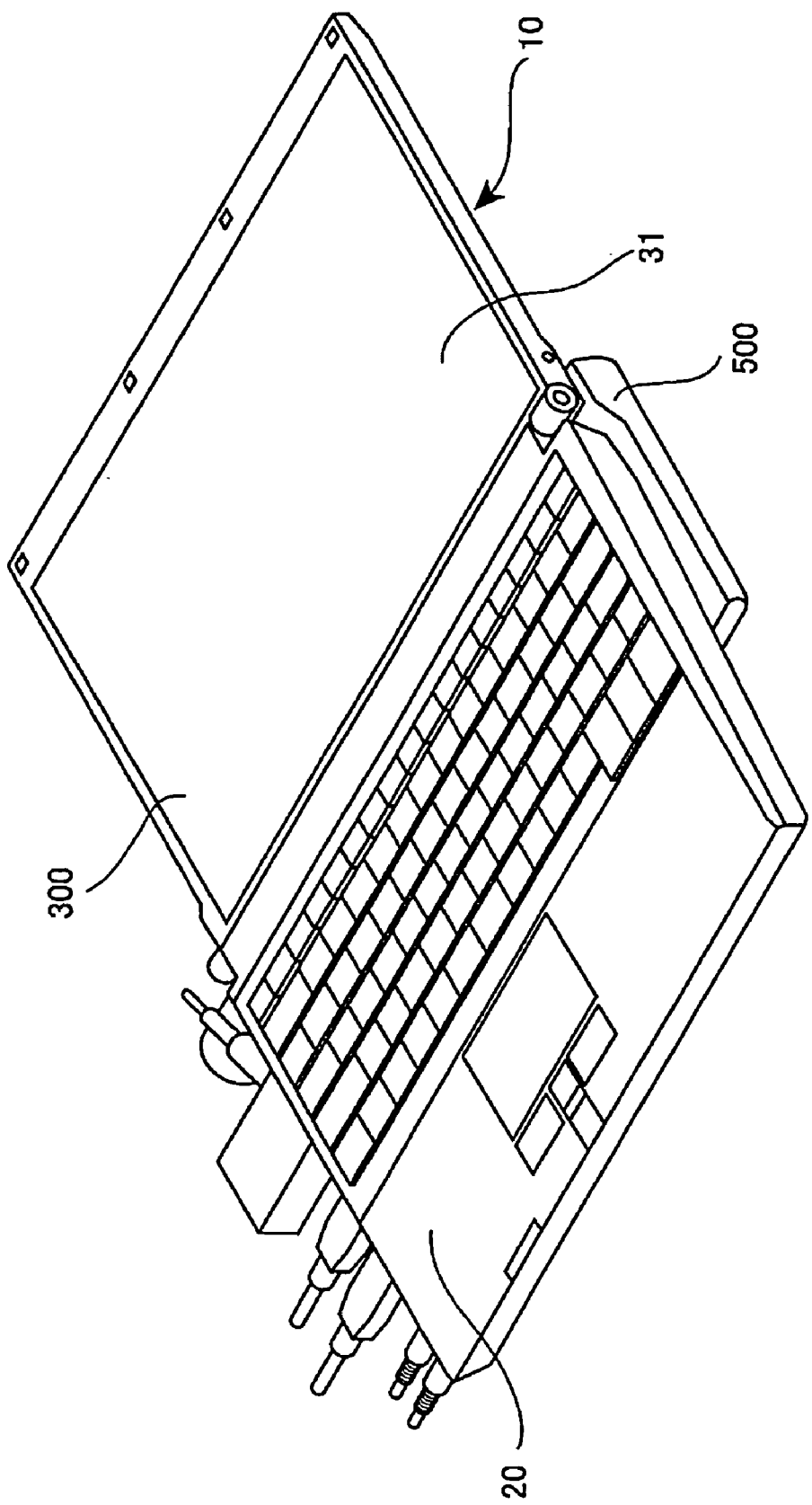
FIG. 31 is a diagram illustrating such a condition that the personal computer is connected to the port replicator.

FIG. 30 is an exterior appearance diagram of a port replicator 500, and FIG. 31 is a diagram illustrating such a condition that the personal computer 10 is mounted to the port replicator 500.

As illustrated in FIG. 30, a connector 510, which is to be combined with the expansion connector 60 of the personal computer 10 when the personal computer 10 is mounted, projects from the upper surface of the port replicator 500. The connector 510 corresponds to one example of the external device side connector of the present invention. When the personal computer 10 is mounted or demounted on or from the port replicator 500, the expansion connector 60 is pushed or pulled with the strong force. However, according to the present embodiment, since the main-unit-side connector 420, the auxiliary board 300B, and the expansion connector 60 are stacked and combined, it is possible to increase the strength, and it is also possible to prevent the backlash and the damage of the expansion connector 60 because the personal computer 10 is repeatedly mounted or demounted.

Next, efforts made to reduce the size and weight of the display unit 30 will be described.

Figure 32:
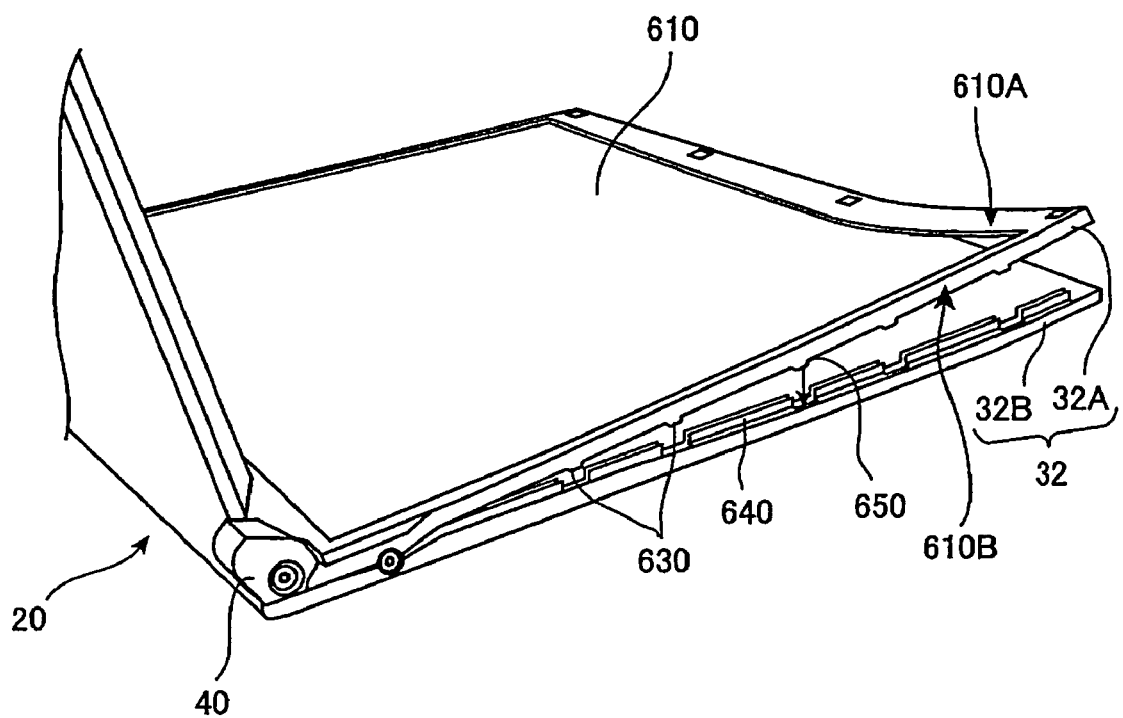
FIG. 32 is a flank diagram of a display section.

FIG. 32 is a flank diagram of the display unit 30.

In the display unit 30, a liquid crystal panel 610 is contained between the front cover 32A and the back cover 32B. The front cover 32A corresponds to one example of the front cover of the present invention, the back cover 32B corresponds to one example of the back cover of the present invention, and the liquid crystal panel 610 corresponds to one example of the display panel of the present invention.

The front cover 32A is composed of: a front frame section 610A which covers a marginal edge in a front side of the liquid crystal panel 610; and a front rib section 610B which goes around a flank of the liquid crystal panel 610. Plural projections 630 which are separated from each other are formed on the bottom edge, which faces the back cover 32B, of the front rib section 610B. The front frame section 610A corresponds to one example of the front frame of the present invention, the front rib section 610B corresponds to one example of the front rib of the present invention, and the protrusion 630 corresponds to one example of the "projection section inserted into the hollow section" of the present invention. In this example, the front rib section 610B corresponds to one example of the second rib of the present invention, and the bottom end surface of the front cover 32A corresponds to one example of the second end surface of the present invention.

Since the back cover 32B and the front rib section 610B are engaged with each other, the back cover 32B covers the flank and the back of the liquid crystal panel 610. In the front end surface of the back cover 32B, which surface faces the front rib section 610B, the inner part (upper stage part 640) close to the liquid crystal panel 610 is formed higher than the outer part (lower stage part). A hollow 650, which is lower than the outer part and in which the protrusion 630 of the front rib section 610B is to be inserted, is formed in the upper stage part 640. The hollow 650 corresponds to one example of the hollow section of the present invention. In this example, the part, which covers a flank of the liquid crystal panel 610, of the back cover 32B corresponds to one example of the first rib of the present invention, and the front end surface of the back cover 32B corresponds to one example of the first end surface of the present invention.

Figure 33:
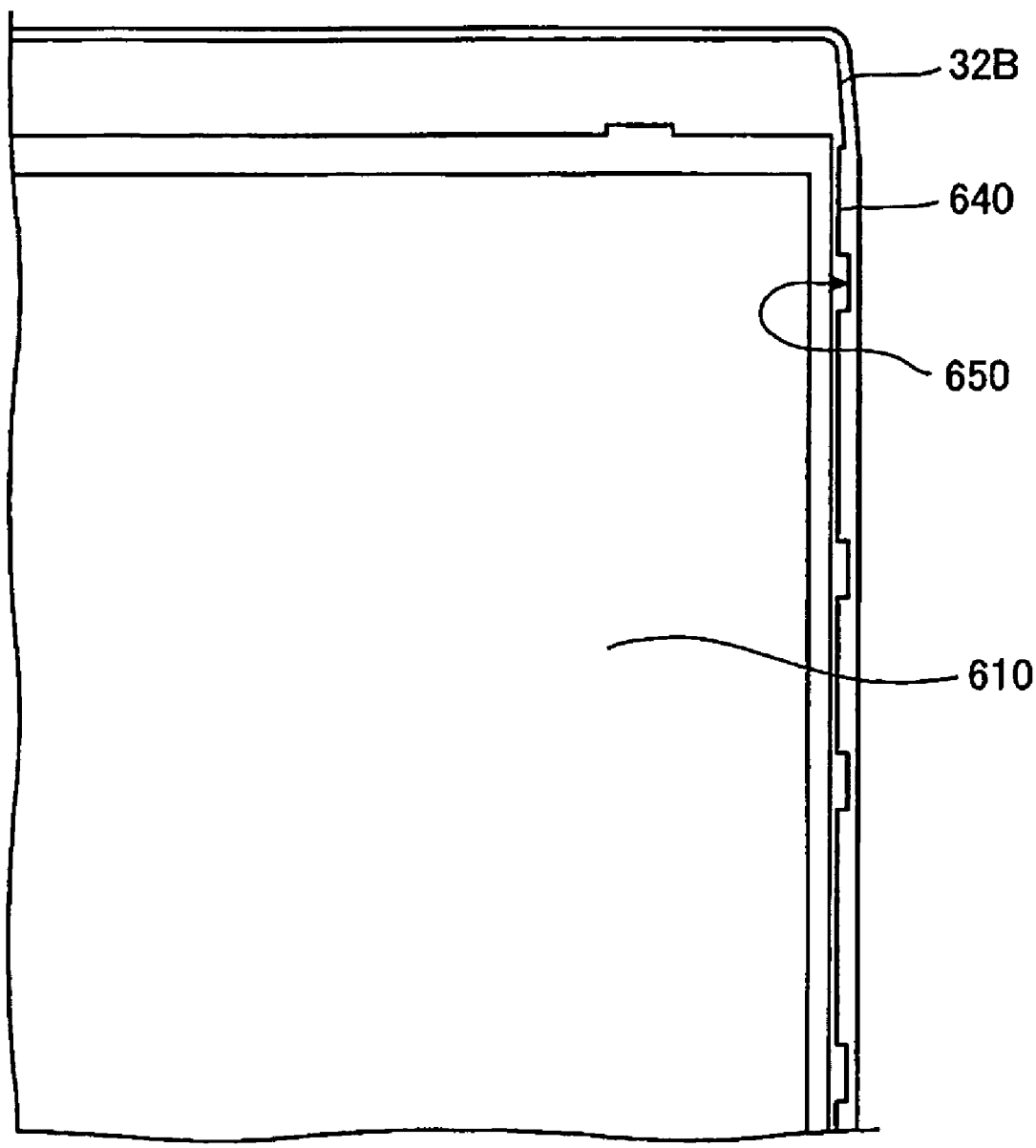
FIG. 33 is a diagram illustrating a display panel attached to a back cover.

FIG. 33 is a diagram illustrating the liquid crystal panel 610 attached to the back cover 32B.

As illustrated in FIG. 33, the plural hollows 650 of the back cover 32B are separately provided along a flank of the back cover 32B, and are open on both of the front end surface and the inner surface.

Figure 34:
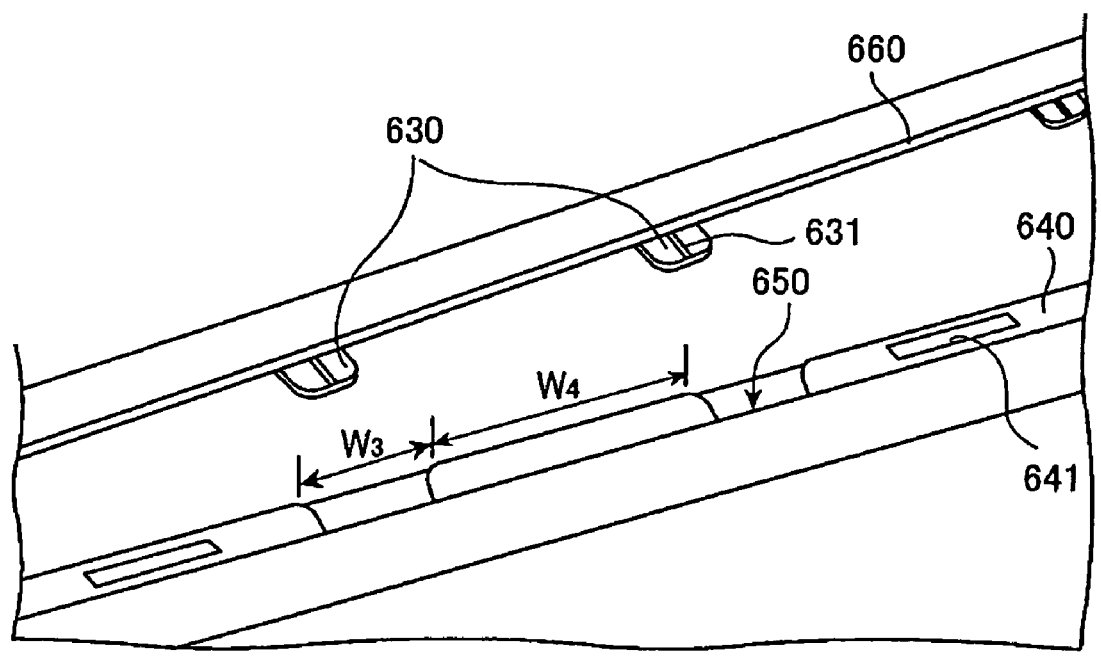
FIG. 34 is an enlarged diagram of an engaging section in which the front cover and the back cover are engaged.

FIG. 34 is an enlarged diagram of an engaging section in which the front cover 32A and the back cover 32B are engaged.

A linear projection 631 is formed in a central part of the protrusion 630, which is also illustrated in FIG. 32, of the front cover 32A, and absorbs a size error of the hollows 650. A frame part 660 of the front cover 32A contacts the lower stage part which is formed in the front end surface of the back cover 32B, and the upper stage part 640 of the back cover 32B is placed inside the frame part 660. A convex section 641, which projects outward, is formed on the upper stage part 640, and is engaged with a convex section 661 formed on the frame part 660 (refer to FIG. 37). The protrusion 630 of the front cover 32A is inserted into the hollow 650 of the back cover 32B. As illustrated in FIG. 34, since a width W3 of the hollow 650 is narrower than a width W4 of the upper stage part 640, the strength of the display housing 32 can be maintained.

Figure 35:
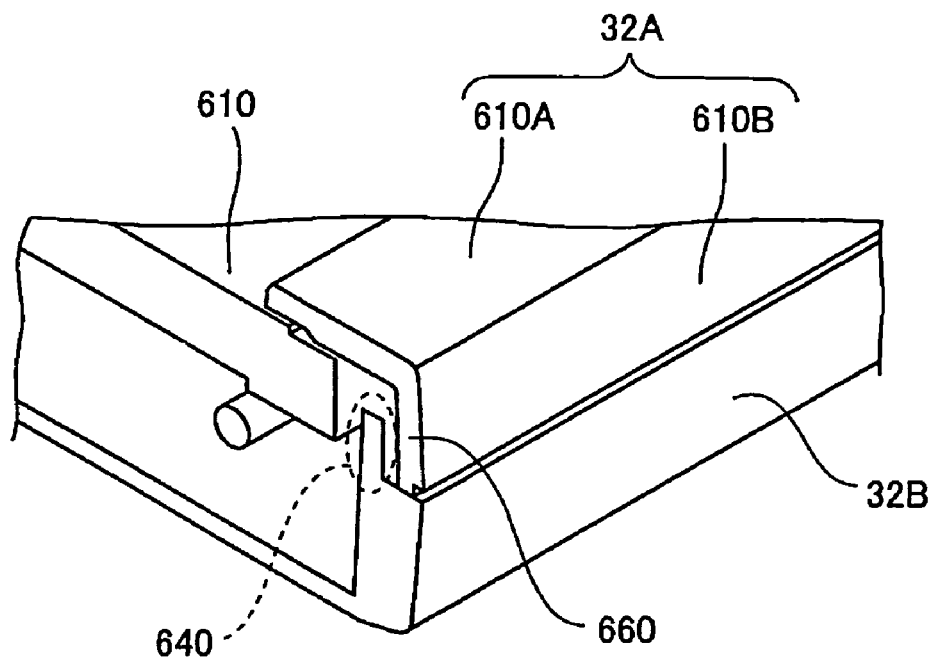
FIG. 35 is a cross-sectional diagram of the display section in a first area in which a convex section is not provided in an upper stage section of the back cover.

FIG. 35 is a cross-sectional diagram of the display unit 30 in a first area in which the convex section 641 is not provided in the upper stage part 640 of the back cover 32B.

In the first area illustrated in FIG. 35, the frame part 660 of the front cover 32A contacts the lower stage part of the back cover 32B, and the upper stage part 640 of the back cover 32B is placed inside the frame part 660 of the front cover 32A while overlapping with the frame part 660.

Figure 36:
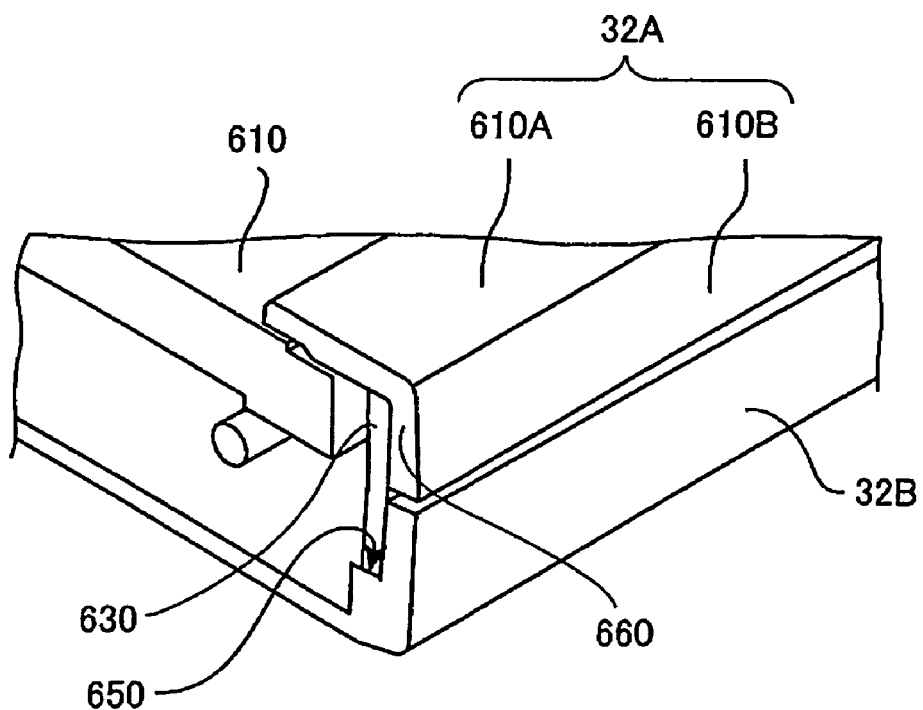
FIG. 36 is a cross-sectional diagram of the display section in a second area in which a projection section of the front cover is provided.

FIG. 36 is a cross-sectional diagram of the display unit 30 in a second area in which the protrusion 630 of the front cover 32A is provided.

In the second area illustrated in FIG. 36, the frame part 660 of the front cover 32A contacts the lower stage part of the back cover 32B, and the hollow 650 deeper than the lower stage part is formed inside the back cover 32B. The protrusion 630 is disposed inside the frame part 660 of the front cover 32A when being inserted into the hollow 650. Therefore, the protrusion 630 of the front cover 32A is inserted into the hollow 650 of the back cover 32B while overlapping with the back cover 32B.

As described above, according to the present embodiment, in the first area illustrated in FIG. 35, the front cover 32A and the back cover 32B are overlapped with each other such that part of the back cover 32B is disposed inside, whereas in the second area illustrated in FIG. 36, the front cover 32A and the back cover 32B are overlapped with each other such that part of the front cover 32A is disposed inside. Thus, since the front cover 32A and the back cover 32B regulate each other while moving in the overlapping direction, it is possible to fix the front cover 32A and the back cover 32B without using an additional component such as a rib, and to reduce the size and weight of the apparatus while increasing the size of the display screen.

Figure 37:
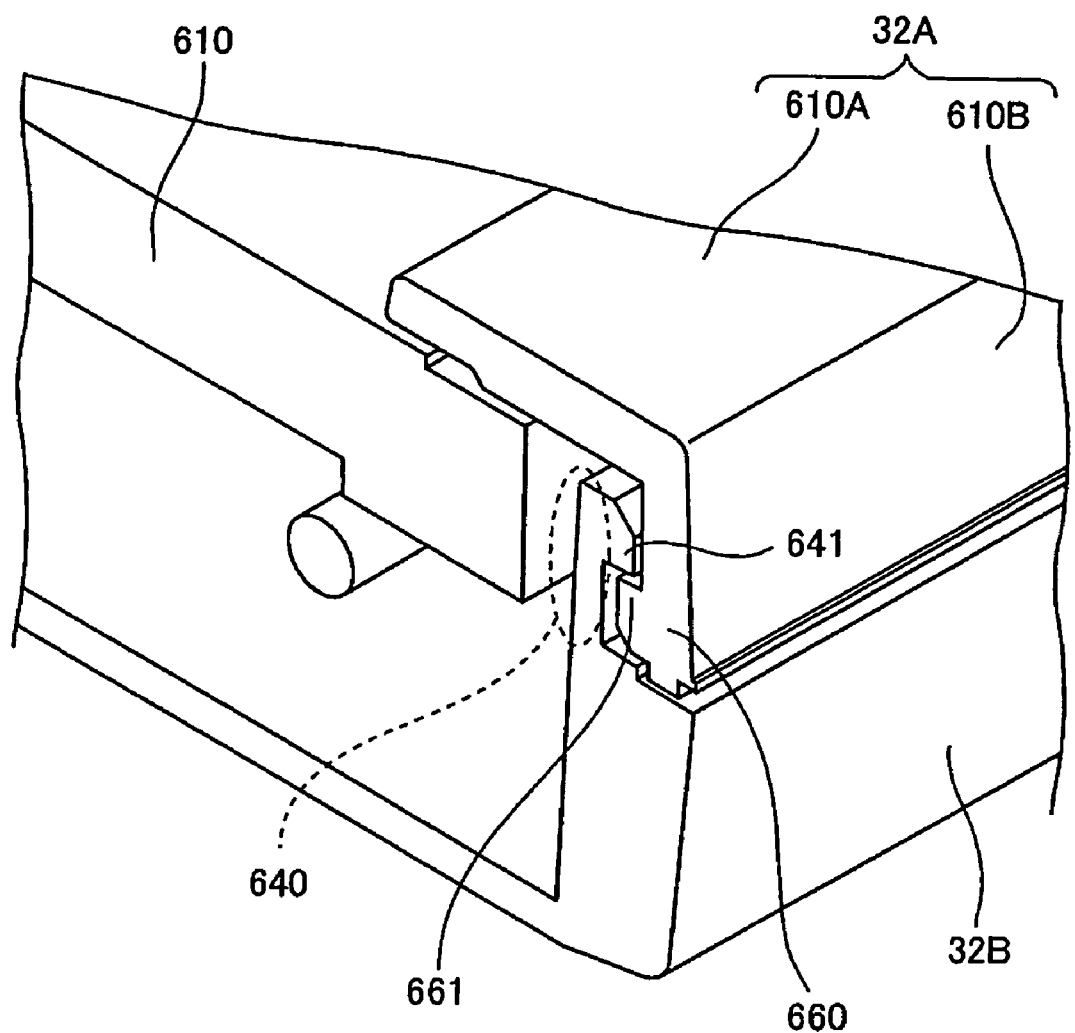
FIG. 37 is a cross-sectional diagram of the display section in a third area in which the convex section is provided in the upper stage section of the back cover.

FIG. 37 is a cross-sectional diagram of the display unit 30 in a third area in which the convex section 641 is provided in the upper stage part 640 of the back cover 32B.

As illustrated in FIG. 37, in the third area, as compared with the first area illustrated in FIG. 35, the convex section 641 that projects outward is provided in the upper stage part 640 of the back cover 32B, and the convex section 661 that projects inward is provided in the frame part 660 of the front cover 32A. Since such convex sections 641 and 661 are engaged with each other, it is possible to securely fix the front cover 32A and the back cover 32B. The convex section 641 of the back cover 32B corresponds to one example of the engaging projection section of the present invention, and the convex section 661 of the front cover 32A corresponds to one example of the engaged projection section of the present invention.

As described above, according to the present embodiment, it is possible to narrow the width of a part, which surrounds the edge of the liquid crystal panel 610, of the display housing 32, thereby reducing the size and weight of the apparatus while increasing the size of the display screen.

Here, in the above description, while the personal computer is used as an example of the electronic apparatus described in "SUMMARY OF THE INVENTION", this electronic apparatus may be a notebook type of computer, a PDA, a game machine, a television, a portable phone, and the like.

In the above description, the liquid crystal panel is used as an example of the display panel of the present invention, but the display panel of the present invention is not limited to the liquid crystal panel and may be any type of display panel such as a plasma display, a field emission display, an organic EL display, and the like.

In the above description, although the hole, which is formed in the partition plate supporting the keyboard at a position corresponding to each of plural keys is octagonal, the hole may be, for example, circular. However, since the shape of a key is generally square in the keyboard provided in a personal computer, the octagonal hole is made in the partition plate and four of the eight sides of the hole are parallel to the four sides of the square key in the above-described embodiment and thus, it is possible to efficiently reduce the weight of the housing while maintaining the strength.

In the above description, while there is used such an example that the flexible printed board is folded so that the hard disk can be prevented from being damaged, the first electronic component of the present invention may be a mechanical driving electronic component other than the hard disk, and for example, may be also a drive for a recording medium, and the like.

In the above description, there is used such an example that the personal computer is connected to the port replicator. However, the function expanding apparatus of the present invention is not limited to the port replicator and may be an expansion station or a docking station that incorporates an optical disk drive, an expansion battery, and the like, and also may be an external adaptor for adding a communication function to the personal computer.

What is claimed is:

1. A display device, comprising:
    a display panel which includes a display screen on a front surface thereof; and
    a display cabinet which has a front cover and a back cover, the front cover including a front frame which exposes the display screen while covering a perimeter of the front surface of the display panel and a front rib which surrounds a rim of the front frame and goes around a perimeter of the display panel along flanks of the display panel, and the back cover including a back plate which covers a back surface of the display panel and a back rib which surrounds a rim of the back plate while going around a perimeter of the display panel along the flanks of the display panel and covers the flanks of the display panel in cooperation with the front rib,
    wherein a first rib which is one of the front rib and the back rib includes a first end surface facing a second rib which is the other of the front rib and the back rib, the first rib further includes a plurality of hollow sections formed at spacing along the flank of the display panel and are opened in both of the first end surface and an inner surface, the second rib includes a second end surface facing the first rib, and the second rib further includes a plurality of projection sections formed at spacing to correspond to the hollow sections and inserted into the hollow sections,
    the display device has such a structure that in a plurality of first areas which are provided along the flank of the display panel and in each of which the hollow section and the projection section are formed, the projection section is inserted into the hollow section, and the first end surface and the second end surface abut each other, and
    the display device further has such a structure that in a second area which is provided along the flank of the display panel and different from the first area, the first end surface and the second end surface abut each other, and the first rib has an overlapping section which protrudes to the inside of the second rib beyond the second end surface and overlaps with an inner side of the second rib.

2. The display device according to claim 1, wherein the first rib includes an engaging projection section which projects outwardly at a position near a tip of the overlapping section in a partial area of the second area, and the second rib includes, in the partial area, an engaged projection section which is engaged in a hollow formed at a position closer to the first end surface than the engaging projection section is.

3. The display device according to claim 1, wherein a width of the single second area in a direction along the flank of the display panel is formed larger than a width of the single first area in the direction along the flank of the display panel.

4. An electronic apparatus, comprising:
 the display device according to any one of claims 1 to 3; and
 an information processing circuit which generates and transfers display information to the display device.

5. The electronic apparatus according to claim 4, further comprising:
 a main housing which contains the information processing circuit; and
 a coupling section which couples the display cabinet openably and closably to the main housing.

* * * * *